US008408914B2

(12) United States Patent
Sanet

(10) Patent No.: US 8,408,914 B2
(45) Date of Patent: *Apr. 2, 2013

(54) SYSTEM AND METHOD FOR LEARNING CHINESE CHARACTER SCRIPT AND CHINESE CHARACTER-BASED SCRIPTS OF OTHER LANGUAGES

(76) Inventor: Morton J. Sanet, North Miami Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/223,925

(22) Filed: Sep. 1, 2011

(65) Prior Publication Data

US 2012/0028226 A1    Feb. 2, 2012

Related U.S. Application Data

(63) Continuation-in-part of application No. 11/443,568, filed on May 31, 2006, now Pat. No. 8,297,978.

(51) Int. Cl.
*G09B 19/00* (2006.01)
(52) U.S. Cl. ........................... 434/156; 434/157
(58) Field of Classification Search .................. 434/156, 434/157
See application file for complete search history.

(56) References Cited

U.S. PATENT DOCUMENTS 4,912,671 A * 3/1990 Ishida ............................... 704/3

OTHER PUBLICATIONS

Kuo et al. "The Effects of Visual and Verbal Coding Mnemonics on Learning Chinese Characters in Computer-Based Instruction." ETR &D, vol. 52, No. 3, 2004, pp. 23-24.
Heisig, James. "Remembering the Kanji Volume I" Japan Publications Trading Company; 4 edition (Aug. 2001).
"Reading & Writing Chinese, Simplified Character Edition," William McNaughton, Third Edition, Tuttle Language Library, inside front and back covers.
Lee, Philip Y. "A Chinese Character a Day" 2004 p. 2-3.
Guenberg "Spanish by Association 1994" p. 7.
"Chinese Literature: 214 Radicals" <retrieved from the Internet at Mar. 6, 2004> <Retrieved from: http://web.archive.org/web/20040603164500/http://www.chinaknowledge.de/Literature>.

* cited by examiner

*Primary Examiner* — Robert J Utama
(74) *Attorney, Agent, or Firm* — Mayback & Hoffman; Gregory L. Maybeck

(57) ABSTRACT

System and method for learning scripts of Chinese character-based languages includes forming a list of user-recognized symbols in a Chinese character-based language, each of the symbols having an associated key with a respective bridge. A complex Chinese multi-character to be learned and added to the recognized list is identified. A set of the user-recognized symbols within the multi-character is recognized. A mnemonic in a language known to the user is formed for recalling the written form of the multi-character. The mnemonic is based upon the keys and bridges associated with the recognized set of symbols within the multi-character. The mnemonic is used to remember the multi-character and, thereby, add the multi-character to the recognized list. Chinese radicals can be sources associated with icons having a logical similarity thereto. The source has the bridge in upper case and three icons use two combinations of lower/upper case and two lower case letters.

20 Claims, 26 Drawing Sheets

BE 生

Think of these: be, because, became, become, before, behalf, behind, being, beneath, beside(s), best, better, between.

| | | | | |
|---|---|---|---|---|
| be | bed | befriend | belles-lettres | berry |
| beach | bedazzle | befuddle | bellhop | berserk |
| beachbum | bedazzlement | beget | bellicose | berth |
| beachcomber | bedbug | beggar | belligerent | beryl |
| beachhead | bedclothes | beggarly | bellow | beryllium |
| beacon | bedding | begin | bellwether | beseech |
| bead | bedeck | beginner | belly | beset |
| beading | bedevil | begone | belong | beside |
| beadle | bedfellow | begonia | belongings | besides |
| beady | bedlam | begrime | beloved | besiege |
| beagle | bedouin | begrudge | below | besmirch |
| beaker | bedpartner | beguile | belnighten | besotted |
| beanie | bedraggled | begun | beltway | bespangle |
| bear | bedridden | behalf | bemire | bestial |
| bearable | bedrock | behave | bemoan | bestiality |
| beardless | bedroll | behavior | bemuse | bestiary |
| bearer | bedroom | behavioral | bend | bestir |
| bearing | bedside | behaviorist | benday | bestow |
| bearish | bedsore | behead | beneath | bet |
| bearskin | bedspread | behemoth | benediction | bets |
| beastly | bedstead | behest | benefaction | bete-noire |
| beat | bedtime | behind | benefactor | betray |
| beatific | beech | behold | beneficent | betrayal |
| beatify | beechnut | beholden | beneficial | betrayer |
| beatitude | beef | beholder | beneficiary | betroth |
| beatnik | beefcake | behoove | benefit | betrothal |
| beau | beefsteak | beige | benevolence | better |
| beau-monde | beefy | being | benevolent | betterment |
| beaujolais | beehive | beknight | benighted | bettor |
| beauteous | beekeeper | belabor | benign | between |
| beautician | beekeeping | belated | benthos | betwixt |
| beautiful | beeline | belch | benumb | bevel |
| beautify | beer | beleaguer | benzene | beverage |
| beauty | beery | belfry | benzoic | bevy |
| beaver | beeswax | belgium | benzoin | bewail |
| becalm | beetle | belle | bequeath | beware |
| became | befall | belief | bequest | bewilder |
| because | befit | believe | berate | bewitch |
| beckon | befog | belittle | bereave | beyond |
| becloud | before | belladonna | beret | bezel |
| become | beforehand | bellboy | beriberi | |
| becoming | | | | |

| | | | | |
|---|---|---|---|---|
| abbey | amber | babel | blueberry | camber |
| abed | ambergris | backbencher | bobbed | camembert |
| aberrant | antebellum | barbecue | bombed | cerebellum |
| abet | antechamber | barbell | boob-tube | chamber |
| abeyance | arabesque | barber | bribe | chambermaid |
| absorbent | asbestos | barbershop | bribetaker | childbearing |
| adobe | ascribe | bathrobe | bride-to-be | clabber |
| adverb | aslumber | big-ben | browbeat | clamber |
| aerobe | astrolabe | blabber | bugbear | climber |
| albeit | babe | blabbermouth | bumblebee | clobber |
| alphabet | babe-ruth | blubber | caliber | clubber |

| | | | | |
|---|---|---|---|---|
| cobwebbed | flabbergast | liberal | renumber | tabernacle |
| cowbell | flambeau | libertine | reabsorbed | test-tube |
| crabbedly | flubbed | liberty | reverberate | throbber |
| cranberry | forbear | limber | roadbed | thumbed |
| cube | freebee | lobbed | robber | tibet |
| cucumber | frisbee | lobe | robe | timber |
| cumbent | gabbed | lube | root-beer | timber-wolf |
| cumbersome | gaberdine | lumber | rubbed | timberjack |
| cupbearer | globe | lumberjack | rubber | timberland |
| curbed | go-between | make-believe | rubberneck | to-be |
| dabbed | goblet | maybe | rubberstamp | torchbearer |
| daubs | goblin | member | rubella | tribe |
| deadbeat | goober | microbe | saber | tube |
| deathbed | grabbed | misbeget | sabertoothed | tuber |
| december | gunbearer | misbehave | scabbed | unabetted |
| decibel | habeas-corpus | mislabel | scribe | unabsorbed |
| deliberate | haberdasher | misnumber | scribed | unbarbed |
| describe | hartebeest | nabbed | scrubbed | unbearable |
| diabetes | heartbeat | moneygrubber | seabee | unbeaten |
| diatribe | hellbent | moonbeam | seabed | unbecoming |
| dismember | hibernate | nabbed | september | unbeknownst |
| disobey | hobnobbed | november | sherbet | unbelief |
| disrobe | honeybee | number | shrubbery | unbend |
| disturbed | honeycomb | numberless | sickbed | unbending |
| doberman | hoofbeat | obedient | slabbed | uncombed |
| doorbell | hotbed | obelisk | slobber | underbelly |
| downbeat | howbeit | obese | slumber | undisturbed |
| dribbed | iceberg | obey | snubbed | unembellished |
| drumbeat | ill-behaved | october | sobbed | unencumber |
| dubbed | imbecile | off-beat | sobeit | unlabeled |
| dumbbell | imbibe | outnumber | sober | unnumbered |
| earlobe | incumbent | overbearing | social-climber | unremembered |
| ebbed | inscribe | pallbearer | somber | upbeat |
| eggbeater | jabbed | perturbed | sorbet | vibe |
| embed | jabber | -phobe | soybean | wardrobe |
| embellish | jabberwocky | plumbed | st.-bernard | well-behaved |
| ember | jibe | plumber | stabber | well-being |
| embezzle | jobber | potbelly | strawberry | wife-to-be |
| encumber | jujube | prepuberty | strobe | wildebeest |
| exuberance | knabe | probe | stubbed | winebibber |
| fibbed | knobbed | protuberant | subbed | workbench |
| fibber | label | rebel | sunbeam | xebec |
| fiber | lambent | recumbent | supreme-being | xenophobe |
| fiberglass | landlubber | redbeard | swabbed | yellowbelly |
| firebombed | libel | remember | tabbed | yohimbe |

FIG. 4B ca

Can, can't

| | | | | |
|---|---|---|---|---|
| cabal | calamine | cambium | cannibal | captan |
| cabana | calamitous | cambric | cannibalize | capsular |
| cabaret | calamity | camel | canniness | capsulate |
| cabbage | calcareous | camellia | cannon | capsule |
| cabby | calcification | camembert | cannonade | captain |
| cabin | calcify | cameo | cannonball | captaincy |
| cabinet | calcimine | camera | canoneer | caption |
| cabinetmaker | calcination | camisole | canon | captious |
| cabinetwork | calcine | camomile | canny | captivate |
| cable | calcium | camouflage | canoe | captivation |
| cablegram | calculable | campaign | canon | captive |
| cabman | calculate | campanile | canonical | captor |
| cabochon | calculating | camper | canonize | capture |
| caboose | calculation | camphor | canopy | capuchin |
| cabriolet | calculator | camphorate | cantabile | carabao |
| cabstand | calculus | camporee | cantaloupe | caracole |
| caca | caldron | campstool | cantankerous | carafe |
| cacao | calendar | campus | cantata | caramel |
| cache | calender | camshaft | canteen | carapace |
| cachet | calendrical | can | canter | carat |
| cackle | calends | can't | canticle | caravan |
| cacophonous | calf | canaille | cantilever | caravansary |
| cacophony | calfskin | canal | canton | caravel |
| cactus | caliber | canalize | cantonal | caraway |
| cadaver | calibrate | canape | cantonment | carbide |
| cadaverous | calico | canard | cantor | carbine |
| caddie | caliper | canary | canvas | carbohydrate |
| caddish | caliph | canasta | canvasback | carbolic |
| caddishness | caliphate | cancan | canvass | carbon |
| caddy | calisthenics | cancel | canyon | carbonate |
| cadence | calk | cancellous | caoutchouc | carbonation |
| cadenza | calk-board | cancer | cap | carbonic |
| cadet | calla | cancerous | capability | carboniferous |
| cadge | callback | candelabrum | capable | carbonize |
| cadmium | caller | candescence | capacious | carboy |
| cadre | calligrapher | candescent | capacitance | carbuncle |
| caduceus | calligraphy | candid | capacitor | carburetor |
| caesar | calling | candidacy | capacity | carcass |
| caesura | calliope | candidate | caparison | carcinogen |
| café | callous | candied | caper | carcinoma |
| café-au-lait | callow | candle | capeskin | card-carrying |
| cafeteria | callus | candlelight | capillarity | cardamom |
| caffeine | calomel | candlepin | capillary | cardboard |
| caftan | caloric | candlestick | capital | cardiac |
| cagey | calorie | candlewick | capitalist | cardigan |
| caginess | calorimeter | candor | capitalize | cardinal |
| cahoots | calumet | candy | capitation | cardiogram |
| caisson | calumniate | canebrake | capitol | cardiograph |
| caitiff | calumnious | canine | capitulate | cardiography |
| cajole | calumny | canister | capon | cardiology |
| cajolement | calve | canker | capriccio | cardiovascular |
| cajolery | calypso | cankerous | caprice | careen |
| cajun | calyx | cankerworm | capricious | career |
| calabash | camaraderie | cannelcoal | capriole | carefree |
| calaboose | camber | cannery | capsize | careful |

FIG. 5A ca 4

| careless | carpeting | casserole | catarrh | catty-corner |
|---|---|---|---|---|
| caress | carport | cassette | catastrophe | catty |
| caret | carrel | cassia | catcall | catwalk |
| caretaker | carriage | casino | catch | caucasian |
| careworn | carrier | cassock | catchall | caucus |
| carfare | carries | cast | catcher | caudal |
| cargo | carrion | cast-off | catchment | caught |
| carhop | carrot | cast-iron | catchpenny | cauliflower |
| caribbean | carrousel | castanets | catchword | caulk |
| caribou | carry | castaway | catchy | causal |
| caricature | carry-over | caste | catechism | causality |
| caricaturist | carry-on | castellated | catechize | causation |
| caries | carryall | cater | catechumen | causative |
| carillon | carsick | castigate | categorical | cause |
| carioca | cartage | casting | categorize | cause-celebre |
| carked | carte-blanche | castle | category | causerie |
| carload | cartel | castor | cater | causeway |
| carminative | cartilage | castrate | catercorner | caustic |
| carmine | cartogram | castration | caterer | cauterize |
| carnage | cartographer | casual | caterpillar | caution |
| carnal | carton | casualty | caterwaul | cautionary |
| carnality | cartoon | casuist | catfish | cautious |
| carnation | cartoonist | casuistic | catgut | cavalcade |
| carnauba | cartridge | casuistry | catharsis | cavalier |
| carnelian | cartwheel | casus belli | cathartic | cavalry |
| carnival | carver | cat-o'-9-tails | cathedral | cavalryman |
| carnivore | caryatid | cat's-paw | catheter | cave-in |
| carol | casaba | cataclysm | cathode | caveat-emptor |
| carom | cascade | catacomb | catholic | caveman |
| carotene | cascara | catafalque | catholicity | cavern |
| carotid | casein | catalan | cation | cavernous |
| carousal | casement | catalepsy | catkin | caviar |
| carouse | cashcard | catalog | catlike | cavil |
| carpel | cashew | catalpa | catnap | cavity |
| carpenter | cashier | catalysis | catnip | cavort |
| carpentry | cashmere | catalyst | catsup | cavy |
| carpet | casino | catamaran | cattail | cayenne |
| carpetbag | casket | catapult | cattiness | cayuse |
| carpetbagger | cassava | cataract | cattle | |

| abacus | altercate | apolitical | astronomical | axiomatically |
|---|---|---|---|---|
| abdicate | ambuscade | apothecary | asymmetrical | aztecs |
| abracadabra | america | applicant | atheistical | bacteriological |
| acacia | amicable | applicable | atheological | balletical |
| academic | amplification | applicant | atmospherical | bankcard |
| academy | analytically | arcade | atomical | barricade |
| acoustical | anatomical | arcane | atypical | basically |
| adjudicate | anecdotically | archaeological | audiocassette | |
| advocate | angelical | aristocratical | authenticate | |
| aerobically | anthropological | arithmetical | autocade | |
| aerodynamical | anticancer | arthritical | autocratical | |
| alcoholically | anticlerical | artistical | autoerotically | |
| algebraical | antiseptically | ascetical | autographical | |
| alley-cat | antitheological | ashcan | autotypical | |
| allocate | antithetical | asthmatical | automatical | |
| alpaca | apical | astrological | avocado | |
| alphabetical | apocalypse | astronautical | avocation | |

FIG. 5B

Rice ✻

| rial | riddance | right-wing | ringleader | risibility |
|---|---|---|---|---|
| rialto | riddle | righteous | ringlet | risible |
| riant | ride | rightful | ringmaster | risk |
| riata | rider | rightish | ringside | risky |
| rib | ridge | rightist | ringtail | risotto |
| ribald | ridicule | rightly | ring-worm | risqué |
| ribaldry | ridiculous | righto! | rink | rissole |
| ribbing | riding | rigid | rinse | ritardando |
| ribbon | rife | rigidity | riot | rite |
| riboflavin | riffle | rigor | riotous | ritual |
| ribose | riffraff | rigor-mortis | rip | ritualistic |
| rice | riffs | rigorous | rip-off | ritz |
| ricer | rifle | rile | rip-roaring | ritzy |
| rich | rifleman | rill | riparian | rival |
| riches | rift | rim | ripcord | rivalry |
| richly | rig | rime | ripe | rive |
| richter-scale | rigamarole | rimy | ripen | river |
| rickets | rigatoni | rind | riposte | river-boat |
| rickety | rigger | ring [jewel] | ripper | riverbank |
| rickrack | right-on | ring [encircle] | ripple | riverbed |
| rickshaw | right | ring! [rrrrring!] | ripsnorter | riverside |
| ricochet | right-angled | ring-necked | rise | rivet |
| ricotta | right-hand | ringfinger | riser | rivulet |
| rid | right-handed | ringer |  |  |

| abridge | ascribe | bettering | briquet | cherish |
|---|---|---|---|---|
| accessorize | aspirin | birthright | brisk | clarify |
| acrid | asterisk | blaring | brisket | clarinet |
| acrimony | astride | blubbering | bristle | clarity |
| actuarial | astringent | blueprint | britches | clattering |
| adrift | atmospheric | blundering | brittle | cluttering |
| adventurist | atrium | boarish | buggering | constrict |
| aerial | attribute | boorish | bullring | contribute |
| affright | auditorium | bowstring | bunkering | contrition |
| aggrieve | authoring | briar | burial | coriander |
| airier | authority | bribe | burrito | corridor |
| airstrip | authorize | brick | cabdriver | crematorium |
| alacrity | avarice | brickbat | cajoleries | crib |
| allegoric | aviatrix | bricklayer | calories | cricket |
| alright | babooneries | brickwall | capricious | crikey! |
| angrier | backfiring | bridal | capturing | crime |
| anterior | bacteria | bride | caribou | crimp |
| antiterrorist | badgering | bridegroom | caries | crimson |
| aperitif | bakeries | bridge | carillon | cringe |
| aphorism | ballerina | bridle | carriage | crinkle |
| appropriate | barbarian | brief | carrier | cripple |
| apricot | baritone | brier | carrion | crisis |
| aquamarine | barium | brigade | cartridge | crisp |
| arbitrarily | barricade | brigand | censuring | crisscross |
| aria | barris | bright | centurion | critical |
| arid | bearing | brilliant | cesarian | critter |
| arise | bedridden | brim | chagrin | culprit |
| aristocrat | befriend | brimstone | chariot | curio |
| arithmetic | behaviorist | brindle | charism | curious |
| arrive | berries | bring | charitable | curriculum |
| arrivederci | besprinkled | brink | charity | customarily |
| asterisk | bestride | brio | cheerio! | daiquiri |

FIG. 6A

Rire ✳

| | | | | |
|---|---|---|---|---|
| dairies | drivel | frigate | hoofprint | lowering |
| daring | driveway | fright | horizontal | lubricant |
| debride | drizzle | frigid | horrible | lumbering |
| debrief | drolleries | frill | horrid | lurid |
| debris | earring | fringe | humanitarian | luxuriant |
| declaring | earthshattering | frisky | humorist | lyric |
| decried | eccentric | frivolous | hurricane | mainspring |
| deferring | editorial | frizz | hurried | majority |
| defibrillate | eerie | furies | hybrid | malaria |
| deglamorize | egocentric | furious | ignoring | mannerism |
| deleterious | electric | futurism | illustrious | manuscript |
| delirious | emeritus | gagwriter | immaterial | margarine |
| demerit | empiric | galleria | immemorial | marigold |
| dentifrice | endangering | garish | imperil | marinate |
| denderize | endocrine | garrison | imperious | marionette |
| deprive | engineering | generic | imploring | mariposa |
| deride | enrich | ghostwriter | impoverish | marital |
| derision | enshrine | gibberish | impresario | marriage |
| derive | esoteric | girlfriend | imprint | material |
| derrick | euphoria | glaring | imprison | materiel |
| describe | excoriate | glorify | impurity | maturing |
| desiring | expatriate | goldbrick | incurring | maverick |
| despairing | experience | gorilla | indoctrinate | meanspirited |
| deteriorate | experiment | goriness | inebriate | memorial |
| deterring | exterior | grammarian | inferior | merit |
| detriment | extricate | gregarious | infringe | merrily |
| detritus | extrinsic | grid | inherit | midriff |
| dexterity | fabric | griddlecake | injuring | minority |
| diapering | factoring | grief | inquiries | mistrial |
| diatribe | familiarize | grill | inscribe | moisturize |
| differing | fathering | grim | inspiring | moribund |
| diphtheria | favorite | grimace | integrity | motoring |
| dirigible | febrile | grime | interfering | murdering |
| disappearing | festering | grin | interim | myriad |
| discovering | figurine | grinder | interior | nativist |
| discriminate | filibustering | grip | intricate | necessarily |
| disfavoring | filmstrip | gripe | intrigue | nectarine |
| disfiguring | fingering | grippe | intrinsic | nefarious |
| disinherit | fingerprint | grit | irrigate | neighboring |
| dismembering | flaring | guerilla | jabbering | newsprint |
| disorient | flavoring | hackdriver | jarring | nightmarish |
| disparity | flooring | hairier | jeering | nondescript |
| distribute | florid | hammering | jinricksha | nonnutritious |
| district | flourish | hamstring | jocularity | nonoriental |
| doctoring | folklorist | handgrip | joyride | nonprofessional |
| doctrine | footprint | handwriting | jurist | nostril |
| dominatrix | forthright | hankering | knaveries | notarize |
| domineering | fostering | harridan | laboring | notoriety |
| downright | foundering | hayride | lariat | |
| dreamier | fracturing | headshrinker | latrine | |
| dribble | fratricide | hearing | leering | |
| dried | friable | heartstring | lettering | |
| drift | friar | heirloom | libertarian | |
| drifter | fricassee | herring | licorice | |
| drill | friction | herringbone | limerick | |
| drink | fridge | hilarious | lingerie | |
| drip | fried | hiring | loitering | |
| drive | friend | historian | lothario | |

FIG. 6B st

| | | | | |
|---|---|---|---|---|
| stab | stannic | statue | stern | stockowner |
| stabile | stannous | statutory | sternum | stockpile |
| stable | stanza | staunch | steroid | stockroom |
| staccato | stapes | stave | stet | stocky |
| stack | staphylococcus | stay | stethoscope | stockyard |
| stadium | staple | steadfast | stetson | stodgy |
| staff | stapler | steady | stevedore | stoic |
| stag | star | steak | stew | stoicism |
| stage | starboard | steal | steward | stoke |
| stage-struck | starburst | stealthy | stewardess | stole |
| stagecoach | starchy | steamboat | stick | stolid |
| stagecraft | stardom | steamer | sticker | stoma |
| stagehand | stardust | steamroller | stickleback | stomach |
| stagflation | stare | steamship | stickler | stomachache |
| stagger | starfish | steamy | stickpin | stomp |
| stagnant | stargaze | steatite | stickup | stone |
| stagnate | stargazer | steed | sticky | stone-deaf |
| staid | starkly | steel | stiff-necked | stonecutter |
| stained-glass | starlet | steelworker | stiffen | stonemason |
| stainless | starlight | steely | stiffener | stonewall |
| stair | starling | steelyard | stifle | stoneware |
| staircase | starlit | steenbok | stigma | stonework |
| stairway | starry | steepen | stigmatic | stony |
| stairwell | starry-eyed | steeple | stigmatism | stooge |
| stake | starstruck | steeplechase | stigmatize | stool |
| stakeholder | start | steeplejack | stile | stoop |
| stalactite | starter | storage | stiletto | stop |
| stalagmite | startle | steersman | still-life | stopcock |
| stale | starve | stegosaur | stillbirth | stopgap |
| stalemate | starveling | stein | stillborn | stoplight |
| stalk | stash | stele | stillness | stopover |
| stalker | stasis | stellar | stilted | stoppage |
| stall | state | stem | stimulant | stopper |
| stallion | statehood | stem-winder | stimulate | stopwatch |
| stalwart | stateliest | stemless | stimulus | storage |
| stamen | stately | stemware | sting | store |
| stamina | statement | stench | stingray | store-bought |
| stammer | stateroom | stencil | stingy | storefront |
| stamp | stateside | stenographer | stink | storehouse |
| stampede | statesman | stenotype | stinkpot | storekeeper |
| stance | statewide | stentorian | stinkweed | storeroom |
| stanch | static | step | stint | storewide |
| stanchion | station | step-(family) | stipend | storied |
| stand-out | stationary | step-down | stipple | stork |
| stand | stationery | stepladder | stipulate | stormy |
| stand-in | stationmaster | steppe | stipulation | story |
| stand-off | statistic | stepping-stone | stir | storybook |
| standard | statistical | stepsibling | stirrup | storyteller |
| standard-bearer | statistics | stepwise | stitch | stoup |
| standardize | stator | stereo | stoa | stouthearted |
| standby | statuary | stereophonic | stoat | stovepipe |
| standing | statue | stereoscope | stockade | stovetop |
| standoffish | statuesque | stereotypic | stockbroker | |
| standpipe | statuette | sterile | stockholder | |
| standpoint | stature | sterility | stockinet | |
| standstill | status | sterilize | stocking | |
| standup | status-quo | sterling | stockman | |

FIG. 7

AD

| ad | adenoids | adjust | adopt | advance |
| adage | adenoma | adjustable | adoptee | advantage |
| adagio | adept | adjuster | adoptive | advantageous |
| adam | adeptness | adjustment | adorable | adverse |
| adam's-apple | adequacy | adjutant | adore | advent |
| adamant | adequate | adjuvant | adorn | adventitious |
| adamantine | adhere | adlib | adornment | adventure |
| adapt | adherent | adman | adown | adventuresome |
| add | adhesion | administer | adoze | adventurous |
| addend | adhesive | administrative | adread | adverb |
| addendum | adhibit | admirable | ad-rem | adverbial |
| adder | ad-hoc | admiral | adrenaline | adversary |
| addible | ad-hominem | admire | adrift | adversative |
| addict | adiabatic | admissible | adrip | adverse |
| addiction | adieu | admission | adroit | adversity |
| addition | ad-infinitum | admit | adscript | advert |
| addle | ad-interim | admittance | adsorb | advertise |
| addle-brained | adios | admix | adulate | advice |
| address | adipose | admixture | adult | advisable |
| addressee | adit | admonish | adulterate | advise |
| adduce | adjacent | admonition | adulterer | advisee |
| adducent | adject | admonitory | adulterous | advisement |
| adducer | adjectival | adnate | adultery | advisor |
| adduct | adjoin | ad-nauseam | adulthood | advisory |
| adductor | adjourn | adnexa | adumbral | advocacy |
| adeem | adjudge | ado | adumbrate | advocate |
| ademonist | adjudicate | adobe | adunc | adynamic |
| ademption | adjunct | adolescence | adust | adze |
| adenitis | adjure | adonis | ad valorem | |

| abracadabra | assuade | behead | cabbagehead | clodhead |
| abrade | astraddle | blackhead | cad | cockshead |
| abroad | autocade | bladder | cadaver | colada |
| academe | avocado | blade | caddie | colonnade |
| accolade | bad | blockade | cadence | compadre |
| acidhead | bad-ass | boatload | cadenza | comrade |
| addlehead | bad-blood | bombadier | cadet | contradict |
| adread | bad-mouth | boneheaded | cadgy | coolheaded |
| aficionado | bad-tempered | brad | cadre | copperhead |
| ahead | bade | braggadocio | caduceus | copyreader |
| alackaday! | badge | bravado | camaraderie | cradle |
| all-pervading | badger | bread | cannonade | crossroad |
| already | badger-state | breadbasket | carload | crusade |
| ambassador | badinage | breadth | cartload | dad |
| ambuscade | badlands | breadwinner | cascade | dad-blamed! |
| animadvert | badman | breathless | cat's-cradle | dad-blasted! |
| antegrade | badminton | brigade | cavalcade | dad-burned! |
| antiradical | baldheaded | broad | chador | dadaism |
| antitrade | ballad | broad-jump | chairlady | dead |
| arpacade | bandleader | broadband | charade | dead-center |
| arcade | bareheaded | broadcast | charlady | dead-end |
| armada | barricade | broaden | cheerleader | dead-eye |
| armadillo | bead | broadminded | chickadee | dead-heat |
| armload | beadle | broadtail | cicada | deadbeat |
| arrowhead | beady | Broadway | circadian | deadbolt |
| asaddle | beady-eyed | brocade | citadel | deadcat |
| aspread | bedspread | bulkhead | clad | deadfall |
| asshead | bedstead | bull-headed | cleadheaded | deadhead |

| | | | | |
|---|---|---|---|---|
| deadline | glad | ironclad | notepad | saddlebag |
| deadlock | glade | irradiate | nowadays | sadist |
| deadly | gladiator | jade | offload | salade |
| deadpan | gladiolus | jughead | olympiad | saleslady |
| deadweight | glissade | keypad | overhead | saphead |
| decade | goad | knead | overlade | scads |
| decadent | gonad | kneepad | overload | scorepad |
| degrade | grad | knucklehead | overshadow | scratchpad |
| desperado | gradable | lackadaisical | overspread | seadog |
| diadem | grade | lad | pad | serenade |
| dissuade | gradient | ladder | paddle | shad |
| dog paddle | gradual | lade | paddock | shade |
| doodad | graduate | ladle | paddy | shadow |
| dos-à-dos | granddad | lady | padlock | shady |
| doubleheader | grenade | ladybug | padre | shipload |
| downgrade | had | lampshade | parade | shortbread |
| download | haddock | lead | paradigm | skedaddle |
| dread | hairsbreadth | leadoff | paradise | skinhead |
| dreadlocks | hammerhead | lemonade | paradox | slade |
| dreadnought | handmade | letterhead | paygrade | sleepyhead |
| drumhead | handsbreadth | levelheaded | payload | snakehead |
| dull-head | hardhead | limeade | peccadillo | softhead |
| dumbhead | head | load | persuade | sorehead |
| dunderhead | headband | loadstar | pervade | spade |
| egad! | headbanger | loggerheads | pigheaded | spearhead |
| egghead | headboard | macadam | pinhead | spread |
| embassador | headcount | mad | plead | spreadeagle |
| embroaden | headdress | madam | pomade | spreadsheet |
| empty-headed | headhunt | madame | pompadour | squad |
| enchilada | headline | madcap | pothead | squadron |
| encradle | headmaster | madden | printhead | stadium |
| eradicate | headquarters | made | promenade | stead |
| escapade | headrest | madhouse | proofread | steadfast |
| esplanade | headroom | madonna | puddinhead | steady |
| evade | heads! | madre | quad | stepladder |
| everglades | headseat | make-do | quadrant | stockade |
| extradite | headshrinker | make-over | quadruped | straddle |
| eyeshadow | headstone | make-ready | quadruple | sunshade |
| facade | headstrong | make-up | quesadilla | swaddle |
| fad | headwaiter | maladjusted | radar | sweetbread |
| fade | headwaters | malady | radial | swellheaded |
| fade-away | headway | manmade | radiant | switchblade |
| far-spreading | headwind | marinade | radical | tad |
| farmstead | headword | masquerade | radio | tadpole |
| fathead | heady | matador | radish | thickheaded |
| fiddle-faddle | helipad | mead | radius | thread |
| figurehead | highroad | meadow | railroad | threadbare |
| footpad | hogshead | misadventure | rattlehead | thunderhead |
| forbade | homemade | misadvise | read | tightwad |
| forehead | homestead | mislead | redhead | tirade |
| foreshadow | homestead | misread | reload | toad |
| freeload | hophead | motorcade | renegade | toadstool |
| fusillade | hothead | muddlehead | road | toady |
| gadabout | inkpad | myriad | roadrunner | tornado |
| gadfly | instead | nadir | roadshow | trade |
| gadget | instead | nightshade | rollerblades | trademark |
| gadzooks! | instead-of | nomad | sad | tradeoff |
| gingerbread | invade | nonadult | saddle | tradesman |

FIG. 8B

AG again, against, age, ago, -age

| | | | | |
|---|---|---|---|---|
| again | agger | agility | agnize | agravic |
| against | aggie | aginner | agnomen | agree |
| agamete | agglomerate | agio | agnostic | agreeability |
| agape | agglutinate | agiotage | agnosticism | agreeable |
| agar | aggrade | agist | ago | agreeableness |
| agasp | aggrandize | agitate | agog | agreeably |
| agate | aggravate | agitation | agon | agreement |
| agave | aggravation | agitato | agonal | agrestal |
| agaze | aggregate | aglare | agone (past) | agrestic |
| age-old | aggregation | agleam | agonic | agricultural |
| age | aggress | aglee | agonize | agriculture |
| aged | aggress | agley | agony | agriculturist |
| ageless | aggression | aglimmer | agora | agrology |
| agelong | aggressive | aglitter | agoraphobia | agronomic |
| agency | aggressor | aglomerate | agouti | agronomist |
| agenda | aggrieve | aglow | agraffe | agronomy |
| agenesis | aggrieve | agminate | agrapha | aground |
| agent | aghast | agnail | agraphia | ague |
| agentry | agile | agnate | agrarian | |

| | | | | |
|---|---|---|---|---|
| abusage | black-magic | dagger | exaggerate | heritage |
| acreage | blockage | damage | extravagant | hiragana |
| adage | bog | defoliage | extravaganza | hoagy |
| adagio | braggart | demagogue | fag | homage |
| advantage | breakage | diagnosis | faggot | hostage |
| afterimage | brokerage | diagonal | farrago | image |
| anagram | brummagem | diagram | fragile | imagine |
| antagonize | bush-league | diaphragm | flag | intaglio |
| appendage | butt-against | discourage | flag-waver | imaginate |
| archipelago | cabbage | disengage | flagellate | jag |
| arrearage | cabbagehead | dishrag | flagon | jagged |
| asparagus | cage | disparage | flagpole | jaguar |
| assemblage | cagey | dosage | flagrant | lag |
| assuage | camouflage | dotage | flagship | lag-behind |
| autophagy | carnage | dowager | flagstone | laggard |
| average | carpetbag | downstage | fleabag | lagniappe |
| backstage | carriage | drag | foliage | lagoon |
| badinage | chagrin | drag-down | footage | language |
| bag | champagne | dragnet | forage | lasagna |
| bagatelle | cleavage | dragon | fragile | lavage |
| bagel | coagulate | dragonfly | fragment | league |
| baggage | coinage | drainage | fragrant | leakage |
| baggy | cold-storage | eager | front-page | leverage |
| bagpipe | collage | eagle | frottage | lineage |
| bandage | collagen | eagle-eyed | fuselage | linkage |
| bandwagon | concubinage | eagle-scout | gag | little-league |
| barrage | conflagration | encourage | gaga | luggage |
| batting-cage | contagion | engage | gage | lumbago |
| baronage | corsage | engage-in | gaggle | magazine |
| beagle | cottage | enola-gay | gagster | magenta |
| beanbag | counteragent | enrage | garage | maggot |
| bedraggle | courage | entourage | garbage | magic |
| beleaguer | coverage | envisage | hag | magistrate |
| beverage | craggy | esophagus | haggard | magma |
| big-league | cro-magnon | etagere | haggle | magna-cum- |
| birdcage | curetage | evaginate | handbag | laude |

| | | | | |
|---|---|---|---|---|
| magnanimous | over-again | rag | shortage | tragedy |
| magnate | over-against | ragamuffin | shrinkage | triage |
| magnet | package | rage | slag | turn-against |
| magnificent | pagan | ragout | slippage | tutelage |
| magnify | page | ragpicker | snag | umbrage |
| magnitude | pageant | raging | snaggle | undamaged |
| magnolia | pageboy | ragtime | soilage | underage |
| magot | pager | rampage | spaghetti | unimaginable |
| magpie | paginate | ravage | spillage | upstage |
| mailbag | pagoda | reagent | spoilage | usage |
| manage | paragon | rise-against | spread-eagle | vagabond |
| marriage | paragraph | rivage | stag | vagal |
| massage | parentage | roughage | stage | vagina |
| meager | parsonage | rummage | stage-fright | vagrant |
| menage | passage | rutabaga | stagecoach | vague |
| menagerie | patronage | sabotage | stagehand | vantage |
| message | pedagogue | sag | stagger | vassalage |
| mileage | Pentagon | saga | stagnate | verbiage |
| minor-league | peatbog | sage | stalag | vicarage |
| mirage | peonage | sagebrush | stalagmite | village |
| miscarriage | percentage | sagittarius | steerage | vintage |
| mismanage | persiflage | salvage | storage | virago |
| mixed-bag | personage | sandbag | stowage | visage |
| moneybags | pillage | sarcophagus | straggle | voltage |
| montage | plagiarize | sausage | stratagem | voyage |
| mortgage | plague | savage | suffrage | wag |
| mucilage | plumage | schoolbag | surplusage | wage |
| nag | postage | scourage | swag | wager |
| necrophagy | pottage | scraggy | swagger | wagon |
| nomage | pragmatic | scrimmage | synagogue | washrag |
| now-and-again | presage | seagoing | tag | windbag |
| offstage | price-tag | seepage | tagalong | wraggle |
| old-age | propaganda | seraglio | tanager | wreckage |
| onager | propagate | sewage | tarragon | yardage |
| orphanage | protagonist | shag | teenager | zigzag |
| outage | punching-bag | shillelagh | tonnage | |
| outrageous | quagmire | | | |

| | | | | |
|---|---|---|---|---|
| aid | aina' | airdry | airless | airspeed |
| aida | air | airedale | airlift | airstream |
| aide | airbase | airfare | airline | airstrike |
| aide-de-camp | airborne | airfield | airmail | airstrip |
| aids | airbrained | airflow | airman | airtight |
| aigrette | airbrakes | airfoil | airmile | airtime |
| ail | airbrush | airforce | airplane | airwave |
| aileron | airbus | airframe | airport | airway |
| ailment | aircondition | airfreight | airpost | airworthy |
| ailurophile | aircraft | airglow | airraid | airy |
| ailurophobe | aircrew | airgun | airship | aisle |
| aim | airdrome | airhead | airsick | aitch |
| aimless | airdrop | airhunger | airspace | |
| ain't | | | | |

| | | | | |
|---|---|---|---|---|
| abstain | bird-brain | cottontail | eyestrain | hair's-breadth |
| acclaim | blackmail | counterclaim | fail | hair-splitting |
| acquaint | bloodstained | countervail | fain | hair-stylist |
| addlebrain | boatswain | crenelains | faint | hair-trigger |
| affair | bobtail | crossgrain | fainthearted | hairbrain |
| aforesaid | braid | curtail | fair | hairbrush |
| afraid | braille | curtain | fair-and-square | haircut |
| afterpain | braindrain | dadaist | fair-haired | hairdo |
| again | brainless | daily | fair-minded | hairpiece |
| against | brainpower | dainty | fairgrounds | hairpin |
| algebraic | brainstorm | daiquiri | fairy | handmaid |
| antiaircraft | brainteaser | dairy | fairy-tale | handrail |
| appertain | brainwash | dairymaid | faith | hangnail |
| appraise | brainwave | dais | falsise | headwaiter |
| archaic | brainy | daisy | fantail | highchair |
| armchair | braise | daisywheel | featherbrain | hightail |
| arraign | bridesmaid | debonair | fingernail | hobnail |
| ascertain | butt-against | declaim | fishtail | horsehair |
| assail | cain | detail | flail | hot-air |
| attain | campaign | despair | flair | housemaid |
| attainder | captain | detail | fountain | jai-alai |
| au-lait | certain | detain | foxtail | jail |
| au-pair | chain | detrain | fraidy-cat | jailbait |
| avail | chair | disclaim | frail | jailbird |
| await | chairmaker | disdain | fraise | jailbreak |
| baaing | chairperson | disrepair | frigidaire | jailhouse |
| bail | chambermaid | distain | funfair | judaiser |
| bail out | champaign | doctrinaire | gaiety | kitchenmaid |
| bailiff | chaplain | domain | gain | lackadaisical |
| bailiwick | chieftain | doornail | gainsay | laic |
| bain | claim | dovetail | gait | laicize |
| bairn | clairvoyance | downstairs | gaiter | laid |
| bait | coattails | drain | goldenrain | lain |
| balalaika | cocaine | draining | good-faith | lair |
| ball-&-chain | cochairperson | ducktail | grail | laity |
| banzai! | cocktail | dumbwaiter | grain | lamebrain |
| bargain | coffin-nail | eclair | grease-paint | liaison |
| barmaid | complain | engrain | grow-faint | longhair |
| bearnaise | complaisant | email | guardrail | maid |
| beaujolais | constrain | entertain | hail | maidenhair |
| bedrail | contain | entrails | hail-from | maigre |
| bewail | containment | exclaim | hailstone | mail |
| billionaire | contrail | explain | hair | mailbag |

| | | | | |
|---|---|---|---|---|
| mailman | ordain | plantain | samurai | traitorous |
| maim | outbargain | quai | scatterbrain | travail |
| main | overpaid | quail | schoolmaid | unacquainted |
| mainframe | paid | quaint | shirttail | unaided |
| mainland | pail | quitclaim | slain | unassailable |
| mainline | pain | raid | snail | unattainable |
| mainspring | painkiller | rail | solitaire | uncertain |
| mainstay | painless | railroad | sprain | unchain |
| mainstream | painstaking | raiment | stair | unclaimed |
| maintain | paint | rain | stairwell | unfairly |
| maize | paintbox | rainbow | straight | unfaithful |
| medicaid | paintbrush | raincheck | straightjacket | ungainly |
| mermaid | pair | raincoat | strain | unobtainable |
| mermaid | paisley | rainmaker | sustain | unpainful |
| migraine | parfait | rainlight | swail | unsaid |
| milkmaid | pertain | raise | swallowtail | upsidaisy! |
| millionaire | pigtail | raisin | swordtail | upstairs |
| minibrain | plaid | rattlebrain | tail | vain |
| minibrain | plain | reconnaissance | tailbone | villain |
| mohair | plainsman | refrain | tailgate | waif |
| monorail | plaint | regain | tailor | wail |
| mosaic | plait | remain | tailspin | waist |
| mountain | plantain | renaissance | taint | wait |
| muddlebrained | ponytail | repair | taipan | waitress |
| naif | porcelain | restrain | terrain | waive |
| nail | portrait | retail | toenail | waylaid |
| nailfile | prairie | retain | trail | wheelchair |
| naive | praise | retrain | train | wraith |
| novocaine | prevail | sail | traipse | yellowtail |
| nursemaid | proclaim | sailor | trait | |
| obtain | prosaic | saint | | |

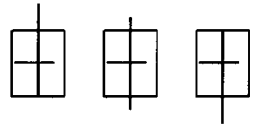
FIG. 11
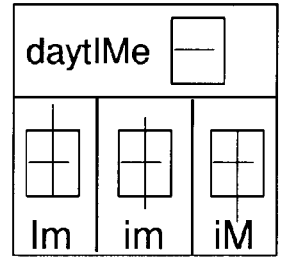
FIG. 12
| Kanji | Pronunciation | Translation | Memory Jogger Sentence |
|---|---|---|---|
| | yó | oil, grease | wATer is Immixable with oil or grease. |
| | shēn | to groan | i'M groanINg. |
| | shyá | a cage or pen | i'M in A Round cage. |
FIG. 13

| Symbol | Transliteration | English | Memory Jogger Sentence |
|---|---|---|---|
| 巾末 | mwò | turban | a turban is like<br>A round bandaNA. |

FIG. 14

| | | | | |
|---|---|---|---|---|
| AN*-AN-ED-LI | 俯 | fŭ, bend down | LA-ON-TH-VE* | 車畐/車畐 |
| AN-ED*-LI | 府 | fŭ, municipal | LI* | 寸 cùn, little |
| AN*-LI | 付 | fù, pay | MA*-SH-SH | 嬰/嬰 |
| BR-LA*-ON | 畫 | huà, picture | MA*-SO | 奴 nü´, slave |
| CA*-PR-TH | 怡 | yí, joyful | PI-RE* | 家 jiā, household |
| DE*-MA-RE | 接 | àn, push | RE*-TH-TH | 宮 gŭng, temple |
| HE*-LA | 思 | sī, think | TE* | 十 shí, ten |
| HE*-PR-TH | 怠 | dài, remiss | TE-TH* | 古 gŭ, old |

FIG. 15

SYSTEM AND METHOD FOR LEARNING CHINESE CHARACTER SCRIPT AND CHINESE CHARACTER-BASED SCRIPTS OF OTHER LANGUAGES

CROSS-REFERENCE TO RELATED APPLICATIONS

This application is a continuation-in-part of U.S. patent application Ser. No. 11/443,568, filed on May 31, 2006, (which application claims priority to U.S. Provisional Application Ser. No. 60/687,566, filed on Jun. 3, 2005), the entire disclosures of which are hereby incorporated herein by reference in their entireties.

STATEMENT REGARDING FEDERALLY SPONSORED RESEARCH OR DEVELOPMENT

Not Applicable

BACKGROUND OF THE INVENTION

Field of the Invention

The present invention relates to a system and method for learning Chinese character script and Chinese-based character script for other languages, for example, written Japanese, Classical Korean, and Classical Vietnamese.

SUMMARY OF THE INVENTION

The invention provides a system and method for learning the written script of Chinese character-based languages, for example, Japanese and Korean, which overcome disadvantages of previously known systems and methods. The present invention provides a more easily facilitated learning tool and method for learning written languages having many characters, such as the thousands of written Chinese characters, some of which are relatively complex.

Because there are thousands of Characters in the Chinese written language, it would be beneficial to provide the student with a memory tool or system that allows him/her to jog his/her memory for obtaining the meaning of the complex Character. The Key-Symbol System provides such benefits by applying a process of breaking down the complex Character and associating English words to each portion of the Character that, when remembered by the student, allows the student to reconstitute the complex Character from the combination of simpler Characters. The Key-Symbol System described herein is a mnemonic, step-wise process for learning the character-based scripts of numerous languages. For example, The Key-Symbol System can be used to learn the written Chinese language. These scripts include those of Mandarin and other Chinese languages such as Fu, Cantonese, Amoy Hokkien, Taiwanese, among many others— both in the classic and simplified forms. These languages/dialects have many alternate forms, abbreviations, dialectic characters, and redundant or archaic characters that are learned easily through The Key-Symbol System. Lexicographers, multi-linguists, philologists, and students can appreciate the learning techniques of The Key-Symbol System.

The Key-Symbol System also can be used to cover the character scripts of Japanese and Korean, even though these two languages have a secondary phonetic syllabary or alphabet, respectively.

The Key-Symbol System could also be used by other Asian languages and cultures that use similar or identical characters for official, decorative, or other purposes. Some of these cultures include those of Thailand, Viet Nam, Singapore, and expatriate communities worldwide.

Names for characters in some of the exemplary languages that can apply The Key-Symbol System are Han-dz (Chinese), Kanji (Japanese), Hanja (Korean), and Chu Nom (Vietnamese).

To prevent redundancy in the description herein, Chinese will be used as the exemplary language for applying The Key-Symbol System to character-based writing systems.

For the purpose of explaining The Key-Symbol System, the following vocabulary will apply:

Character: The equivalent of a written word in English. A Character is a complete written Chinese word.

The Character 迷, pronounced mee in the second tone, means "to be lost" and is a complete written Chinese word.

Symbol: A part of a Character, roughly equivalent to a single letter in English. Just as the letters "d" and "o" make up the word "do," the symbols 辶 and 米, together, form the character 迷 pronounced "mee" and having the meaning "to be lost." Symbols combine to form complete Chinese words just as letters combine to form English words. For purposes of the present invention, the term Symbol includes what standard grammar texts refer to as radicals ["roots"] and non-radical elements. Symbols follow a standard numbering configuration in all textbooks and are used to classify all Characters.

The Key-Symbol System uses a memory association technique for making complex Characters easier to remember by taking advantage of the fact that such Characters are composed of combinations of other, more basic and easily recognizable Characters already known by a user, herein referred to as a student.

Simply put, the student begins learning some basic Chinese Characters. For example, the Symbol for the word "step" is 辶 and the Symbol for the word "rice" is 米.

After a subset of basic Symbols and Characters is known, the student begins recognizing combinations of these basic Symbols or Characters in more complex Characters. However, the meanings of the basic Symbols or Characters within a more complex Character may not be relevant to the overall meaning of the complex Character.

In particular, The Key-Symbol System separates complex Characters into their constituent parts (Symbols and/or Characters) referred to herein as Symbols. These Symbols have particular meanings, already known to the student, because they are in a subset of his/her learned Characters. A Key is one of the definitions of the Symbol. For example, "step" is one of the definitions of the Symbol 辶 and has been chosen to be the Key for that character. The "key" or "keyword" of the invention is a single paradigm word that best describes the Chinese Symbol. With the present invention, the "single" keyword provides a reliable anchor that invokes the writing of a particular Symbol by the student. The single keyword of the present invention is invariable. If a Symbol has more than one keyword associated with it, one would not know which word was used in the build-up of any larger complex character (i.e., kanji) in which it is found. The present invention does not stop there. It further defines a set of letters within the Key and refers to it as the "Bridge." The Bridge connects the Symbol and its Key to the entire dictionary of words that contain the same Bridge. Words that have the same Bridge can then be equated to the Key and the Symbol to which it is attached. The Bridge provides structure to learning of an Asian Character and is not a feature of any other system. The present invention puts thousands of words at the student's disposal for learning each kanji. Fashioning a relevant sentence is simple, fast, and easy to remember without the slightest loss of accuracy.

The Key-Symbol System of the present invention is not limited to English. This System can be applied to any Latin alphabet-based language such as Spanish, Portuguese, French, Italian, or German, or to transliterations of non-Latin alphabets such as Russian, Greek, Hebrew, Aramaic, Arabic, etc.

A particular example parses the complex Character 迷 having the meaning "to get lost." This two-part complex character includes two Symbols, the first Symbol 辶 is for the word "step" and the second Symbol 米 is for the word "rice." Thus, the Keys for the symbol for the verb "to get lost" are the English words "step" and "rice."

Next, each Key is broken down by defining its first two letters as a Bridge. Here, "r" and "i" and "s" and "t", respectfully, form the Bridges "RI" and "ST."

To facilitate the visual impression, the Bridge is typed or hand printed in bold, underlined upper-case letters (which can also be red in color if the student desires). The remainder of the Bridge is typed or handwritten in unbolded, black non-underlined lower-case letters. For example RIce, STep. Therefore, to remember the complex Character 迷 for the verb "to get lost," the student knows that he/she needs to remember a catch-phrase, or mnemonic, having the two Bridges "ST" and "RI." In the English language, there are many words containing the Bridges "ST" and "RI." Some words begin with one of these Bridges, and some words contain one of these Bridges in the interior. For example, the words "riot" and "crisis" each contain the Bridge "RI" and the words "storm" and "arrest" each contain the Bridge "ST." To apply The Key-Symbol System, the student defines the mnemonic Memory Jogger "STorm RIot" or the mnemonic Memory Jogging Sentence "Swept up in the STorm or a RIot" for the complex Character 迷 having the meaning "to get lost." It is noted that the only upper-case letters in a Memory Jogger Sentences are those which form parts of Bridges. All other letters are lower-case even if they are the first letter of a proper noun, the first letter of a sentence, or are customarily upper-case such as "I" or "USA."

Now that the student has the mnemonic associated with the Character for "to get lost," all that the student needs to do to write the complex Character is to recall and deconstruct the mnemonic. The student then determines the Bridges "ST" and "RI" from the mnemonic. The student knows that the Bridge "ST" always carries the Key "step" and that the Bridge "RI" always carries the Key "rice." Because the student already knows the simple Chinese Characters 辶 and 米 for the words "step" and "rice," respectively, the student merely writes down these two Characters next to one another and, therefore, has written the complex Character 迷 having, as its meaning, "to get lost."

The Key-Symbol System can be applied to any complex Chinese Character and further examples can be appreciated without describing them herein.

With variations in single Characters, The Key-Symbol System can be expanded to address these and other concerns using a Source-Icon System. The Source Icon System allows the differentiation of three variations of a single character 木, such as 不 未 末. Each of the three variations has the same strokes, but one additional horizontal stroke intersects at different points on the first Character.

The Key-Symbol System selects an English word (the Key or the Keyword) and its Bridge (the abbreviation of the Key) and joins them to a given Character to form a trio. In the Source-Icon System, the Symbol of the Trio is considered as a "Source" for other symbols that resemble it or that, in some way, form a pattern with the Symbol. These other symbols are referred to as "Icons" of the Source. The Source-Icon System modifies the Bridge by taking advantage of the upper- and lower-case forms of each of the two letters within the Bridge. Binary logic of upper and lower case letters provides four possible configurations for a two-letter Bridge. Using the Bridge "ST", for example, provides the following four possibilities: "ST", "St", "st", and "sT". The Source-Icon takes advantage of this definite set to associate the single Source from the three possible Icons associated with that Source.

With the objects of the invention in view, there is provided a method for learning scripts of Chinese-character-based languages using a computer-based key-symbol system including the steps of storing a set of pages in an electronic key-symbol dictionary, each of the pages having a bridge entry respectively associated with a single Chinese radical within a set of Chinese radicals in a Chinese-character-based language, having the single Chinese radical as a symbol, having a single keyword corresponding to a given meaning of the single Chinese radical, the single keyword being in a user's language and having letters in the user's alphabet and including therein a bridge comprised of at least one of the letters, and having a plurality of different memory joggers, each of the different memory joggers being a word in the user's language containing therein the bridge, creating a user-recognized radical dictionary by identifying a list of user-recognized Chinese radicals and electronically collating the pages associated with each of the user-recognized Chinese radicals, and creating a user-recognized complex-character dictionary by identifying a complex Chinese multi-character to be learned, electronically transcribing a set of at least two of the user-recognized Chinese radicals within the complex Chinese multi-character to be learned, and electronically transcribing a mnemonic in the language of the user for recalling the written form of the complex Chinese multi-character, the mnemonic being based upon the keywords, memory joggers, and bridges associated with the recognized set of the at least two user-recognized Chinese radicals within the complex Chinese multi-character.

In accordance with a further mode of the invention, the written form of a Chinese multi-character is recalled by selecting the Chinese multi-character from one of the complex Chinese multi-characters within the user-recognized complex-character dictionary and displaying the mnemonic associated with the one complex Chinese multi-character within the user-recognized complex-character dictionary.

In accordance with an added mode of the invention, the list-identifying step is carried out by electronically adding a new page of the electronic key-symbol dictionary to the user-recognized radical dictionary for each new user-recognized Chinese radical.

In accordance with an additional mode of the invention, the bridge is utilized as the first two letters of the selected keyword.

In accordance with yet another mode of the invention, the complex Chinese multi-character has a meaning different from constituent parts of the user-recognized Chinese radicals within the complex Chinese multi-character when read separately.

In accordance with yet a further mode of the invention, the mnemonic-transcribing step is carried out by displaying the complex Chinese multi-character into the separate Chinese radicals within the list of user-recognized Chinese radicals, displaying the keywords and associated bridges for each of the separate Chinese radicals within the complex Chinese multi-character, selecting memory joggers from each of the pages for each of the separate Chinese radicals in the user-recognized radical dictionary, and electronically creating the mnemonic in the language of the user based upon the selected memory joggers.

In accordance with yet an added mode of the invention, the mnemonic-transcribing step is carried out by emphasizing the bridge within the mnemonic.

In accordance with yet an additional mode of the invention, the mnemonic-transcribing step is carried out by emphasizing the bridge with a different typeface than the remainder of the letters in the mnemonic.

In accordance with again another mode of the invention, the written form of the complex Chinese multi-character is identified by associating together each of the symbols corresponding to the at least two user-recognized Chinese radicals.

In accordance with again a further mode of the invention, the written-form-identifying step is carried out by displaying the mnemonic associated with the complex Chinese multi-character, extracting the memory joggers within the mnemonic, extracting the bridges contained within the memory joggers, displaying the symbols associated with the extracted bridges, and organizing the displayed symbols to form the written multi-character.

In accordance with again an added mode of the invention, the Chinese-character-based language is selected from at least one of the group consisting of Japanese, Korean, Mandarin, Fu, Cantonese, Amoy Hokkien, Taiwanese, Thai, Vietnamese, Singaporean.

In accordance with still another mode of the invention, the language of the user is selected from one of Latin alphabet-based languages and transliterations of non-Latin alphabet-based languages, for example, Spanish, Portuguese, French, Italian, German, Russian, Greek, Hebrew, Aramaic, and Arabic.

In accordance with still a further mode of the invention, each of the set of Chinese radicals is defined as a source and at least one icon is associated with a respective source, the at least one icon being a Chinese character having a physical similarity to the source. The physical similarity is selected from a group consisting of either a visual similarity, a multiple occurrence similarity, or a similarity in meaning.

In accordance with still an added mode of the invention, for each user-recognized Chinese radical, a keyword corresponding to a selected definition of the user-recognized Chinese radical is defined from a range of more than one definition for that user-recognized Chinese radical and a bridge corresponding to two letters within the keyword, the source is stored with the two letters in upper case, a variation of the source having at least one of the two letters is stored in lower case, and the variation of the source is stored as an association of the at least one icon.

In accordance with still an additional mode of the invention, the at least one icon is three icons and the source is stored with the two letters of the bridge in upper case and three variations of the source is stored having a first letter in upper case and a second letter in lower case, the first letter in lower case and the second letter in lower case, and the first letter in lower case and the second letter in upper case, and the three variations of the source are stored as an association of a respective one of the three icons. For example, the Source (the original Symbol in two capital letters, e.g., ST) can give rise to three additional related Symbols that can be labeled by the same letters with different casing. For example, St, st, and sT.

In accordance with a further mode of the invention, the Chinese radicals are selected from all Chinese radicals, traditional and modern.

In accordance with a concomitant mode of the invention, a four-part matrix for each of the Chinese radicals is formed, each of the four parts corresponding to one of the source and the three variations.

Although the invention is illustrated and described herein as embodied in a system and method for learning the written script of Chinese character-based languages, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which:

FIGS. 4A and 4B is a list of words representing an exemplary dictionary according to the invention for the word "beget";

FIGS. 5A and 5B is a list of words representing an exemplary dictionary according to the invention for the word "cardiac";

FIGS. 6A and 6B is a list of words representing an exemplary dictionary according to the invention for the word "rice";

FIG. 7 is a list of words representing an exemplary dictionary according to the invention for the word "step";

FIG. 8A to 8F is a list of words representing exemplary dictionary according to the invention for various words;

Figure 9A:
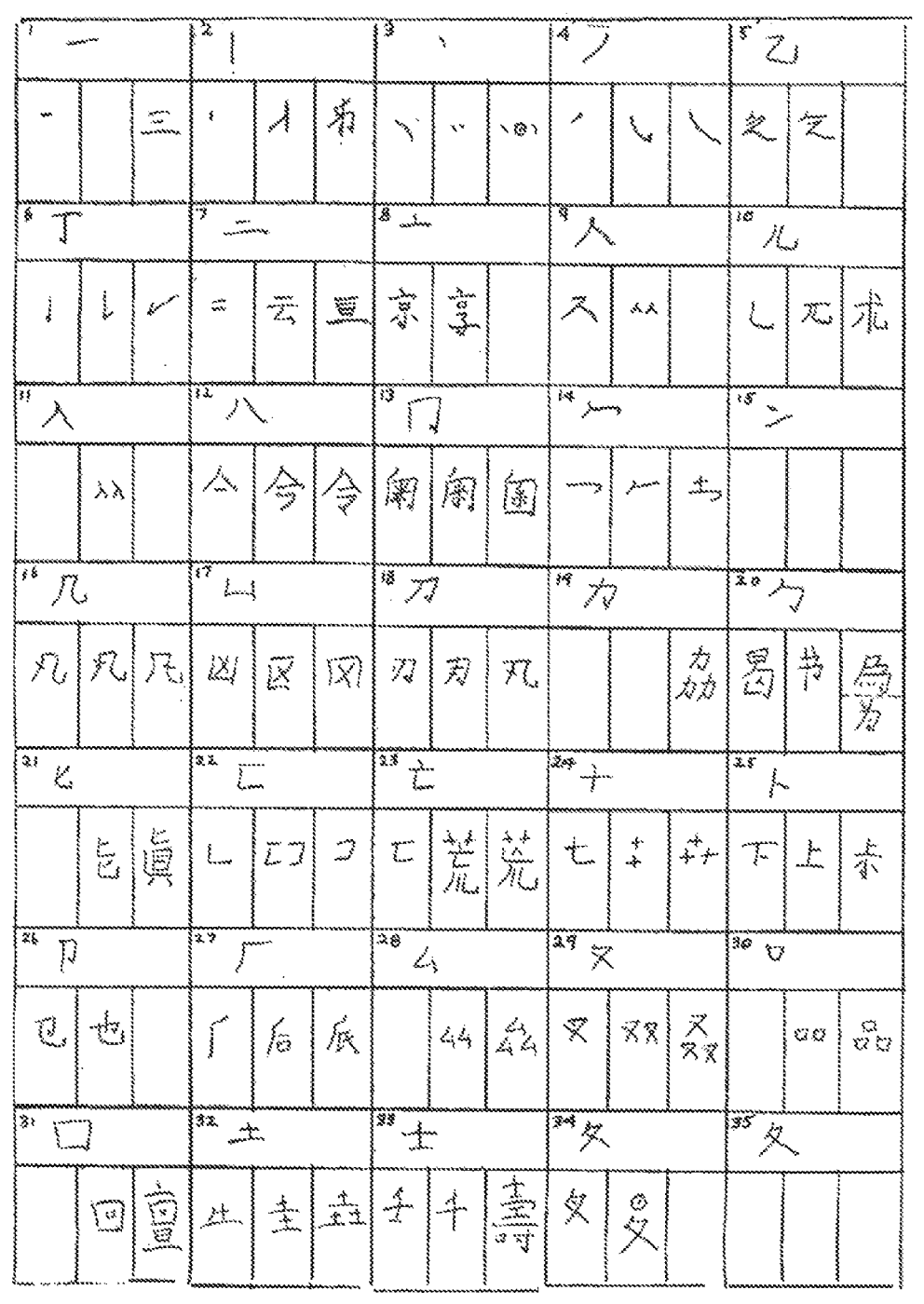
Figure 9B:
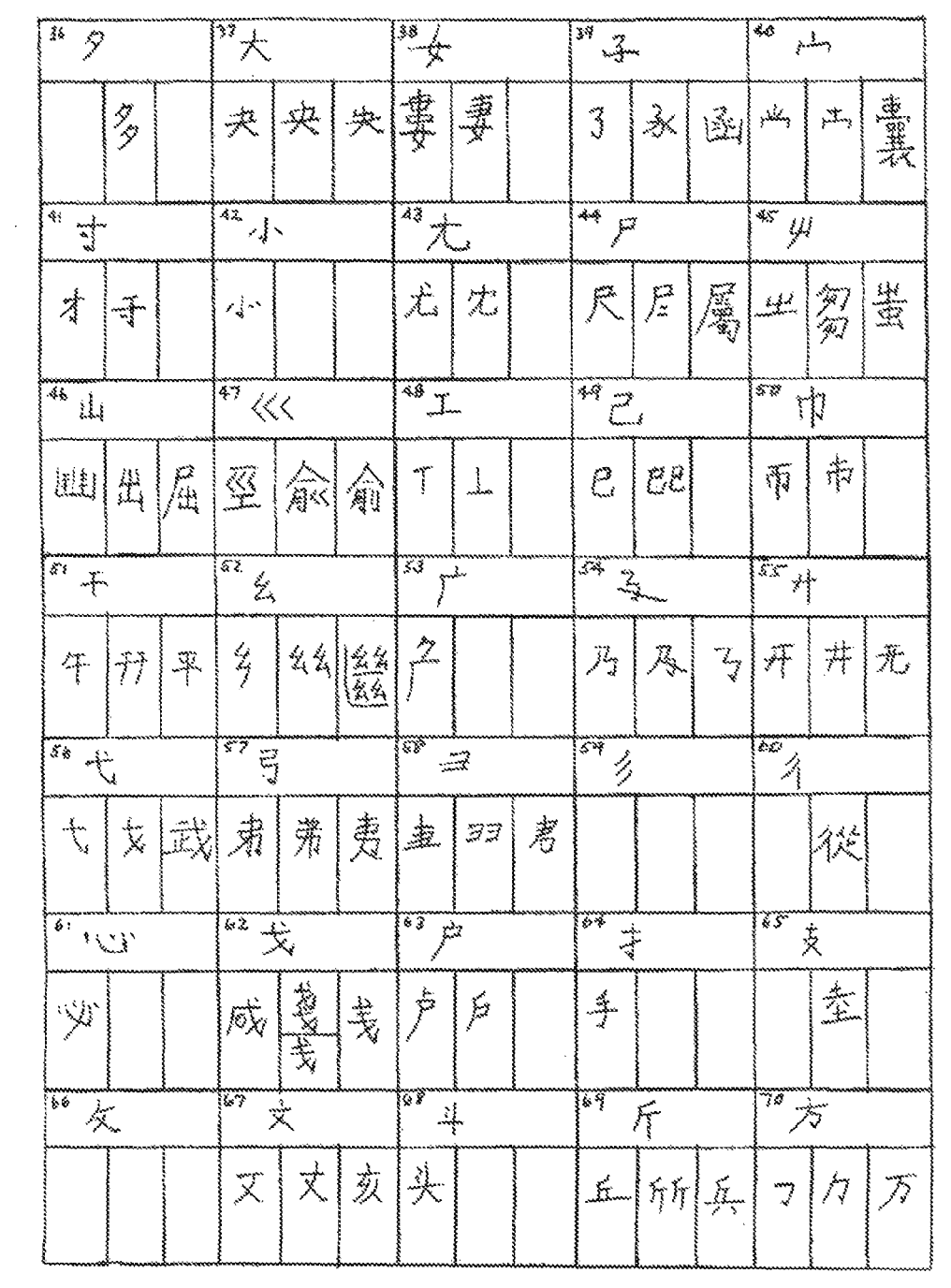
Figure 9C:
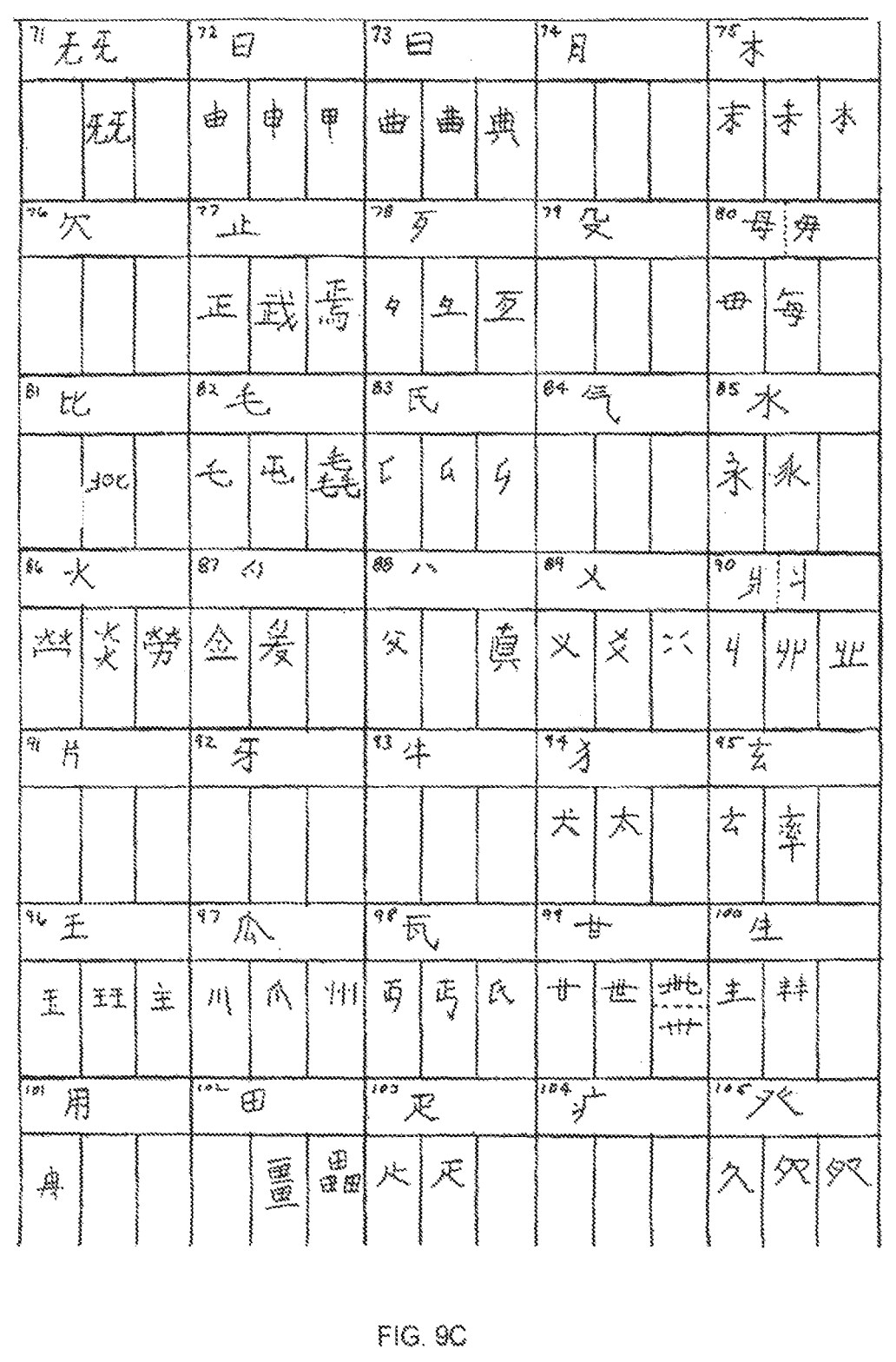
Figure 9D:
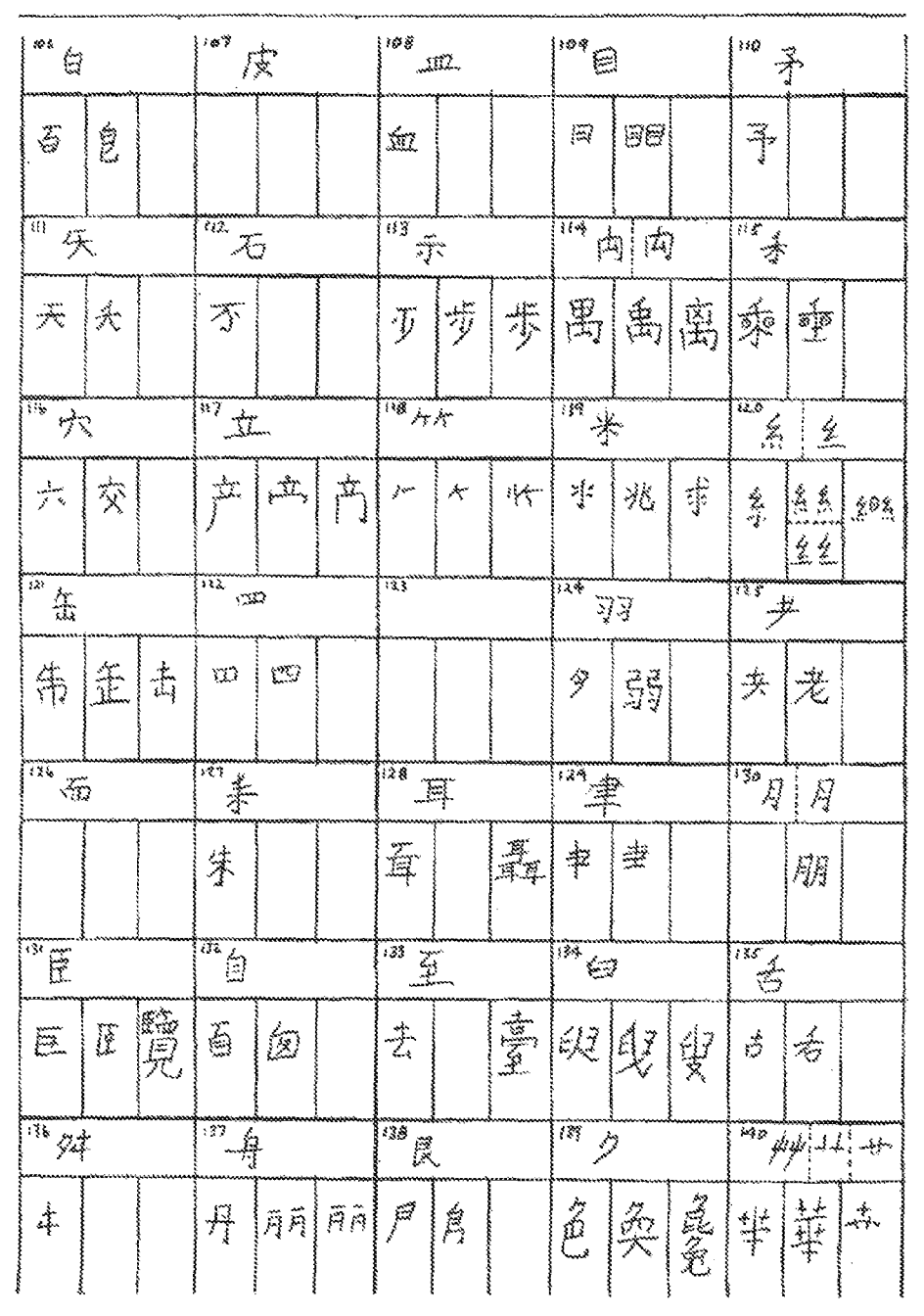
Figure 9E:
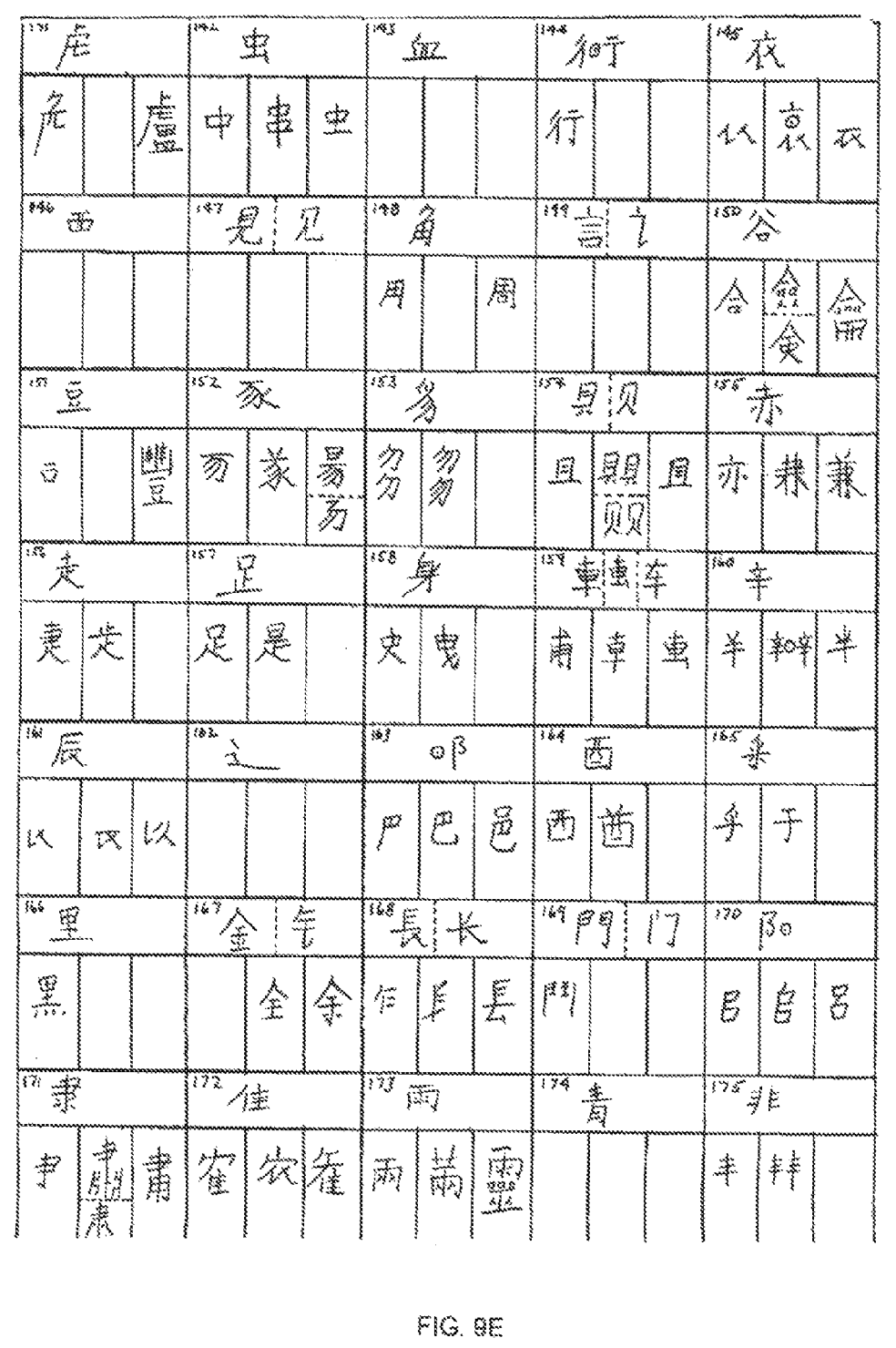
Figure 9F:
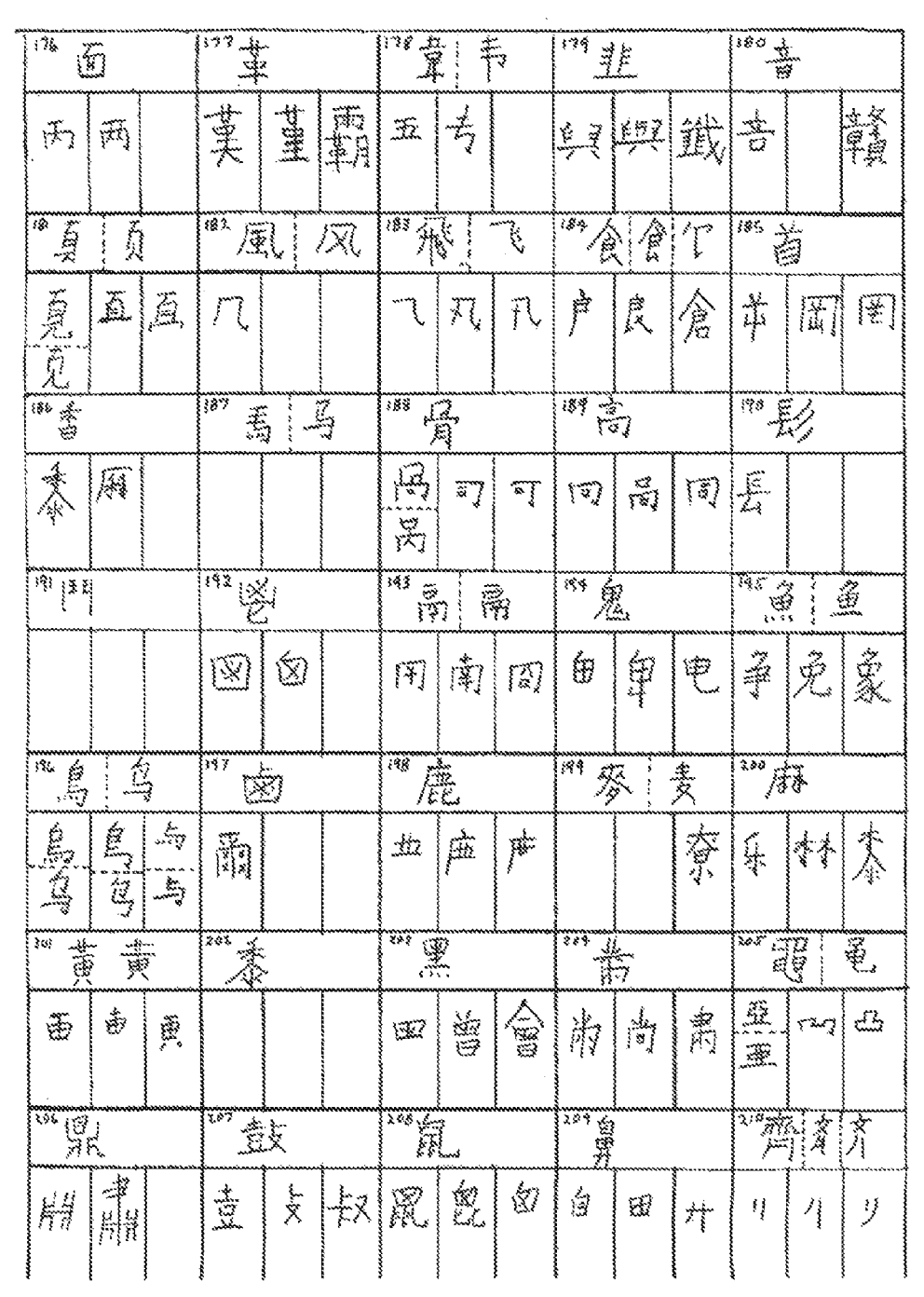
Figure 9G:
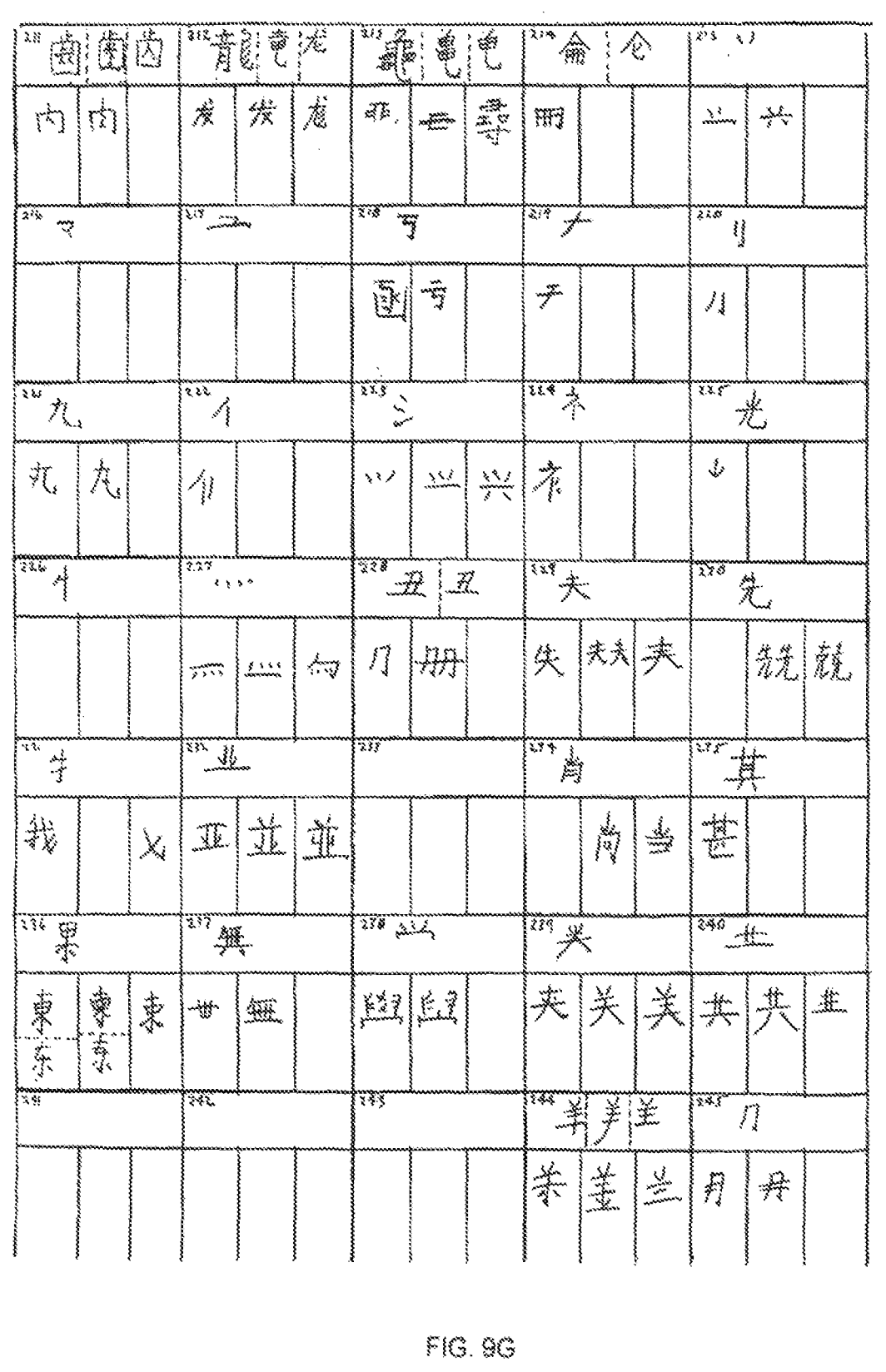

FIG. 9A to 9G is a chart of matrices grouping a single Source with its one, two, or three respective Icons.

FIG. 11 is a set of three icons of a Chinese character according to the Source-Icon System;

FIG. 12 is a chart of the source and icons of the Chinese character of FIG. 11;

FIG. 13 is a chart of a portion of a user-recognized, complex Chinese dictionary with three user-recognized complex Chinese characters and the user-assigned memory jogger sentence;

FIG. 14 is a single entry in a user-recognized, complex Chinese dictionary with one user-recognized complex Chinese character and the user-assigned memory jogger sentence; and FIG. 15 is a user-recognized complex-character dictionary with the user-recognized complex Chinese characters in alphabetic order.

DETAILED DESCRIPTION OF THE INVENTION

Figure 1:
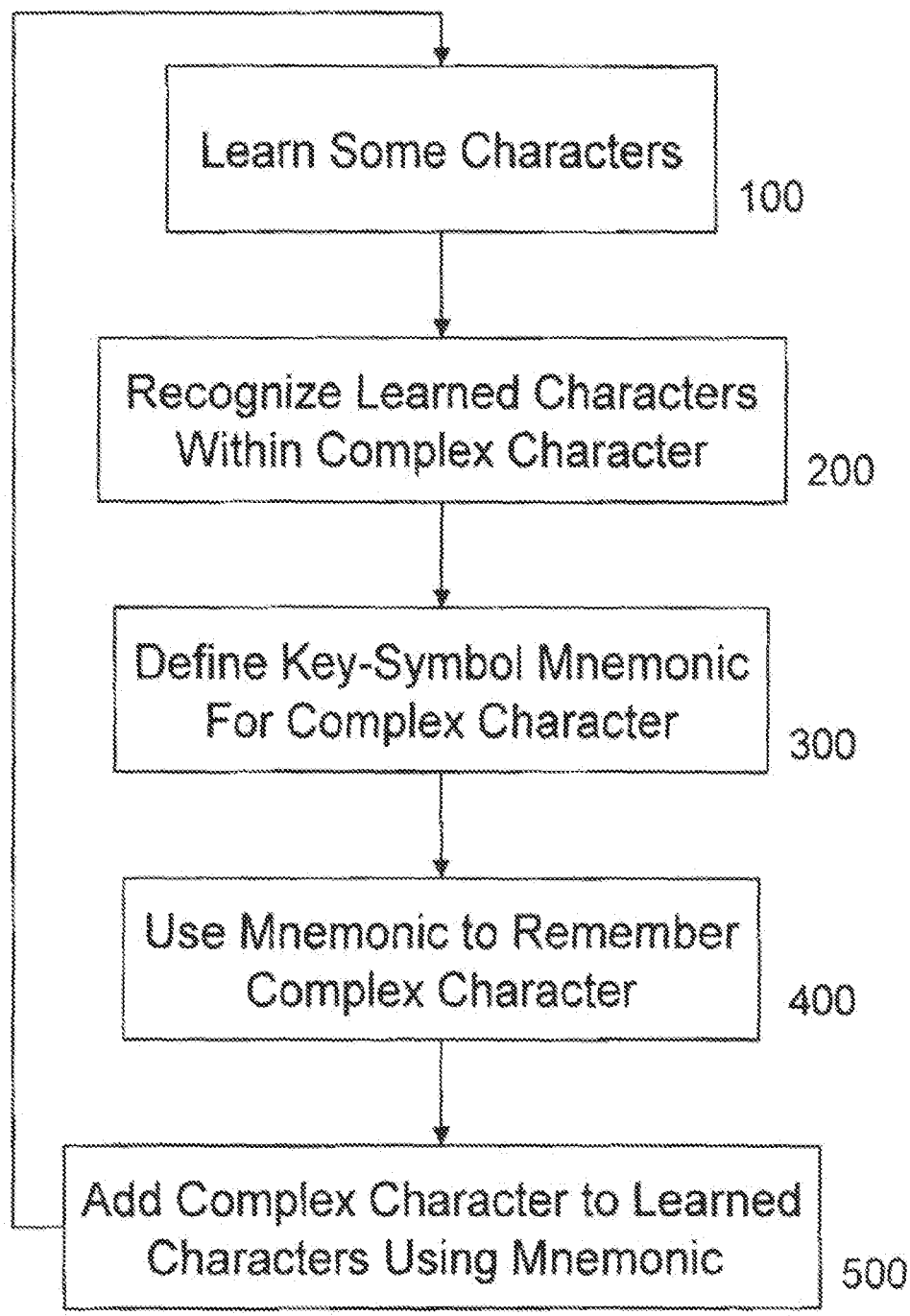
FIG. 1 is a flowchart of the method according to the invention.
Figure 2:
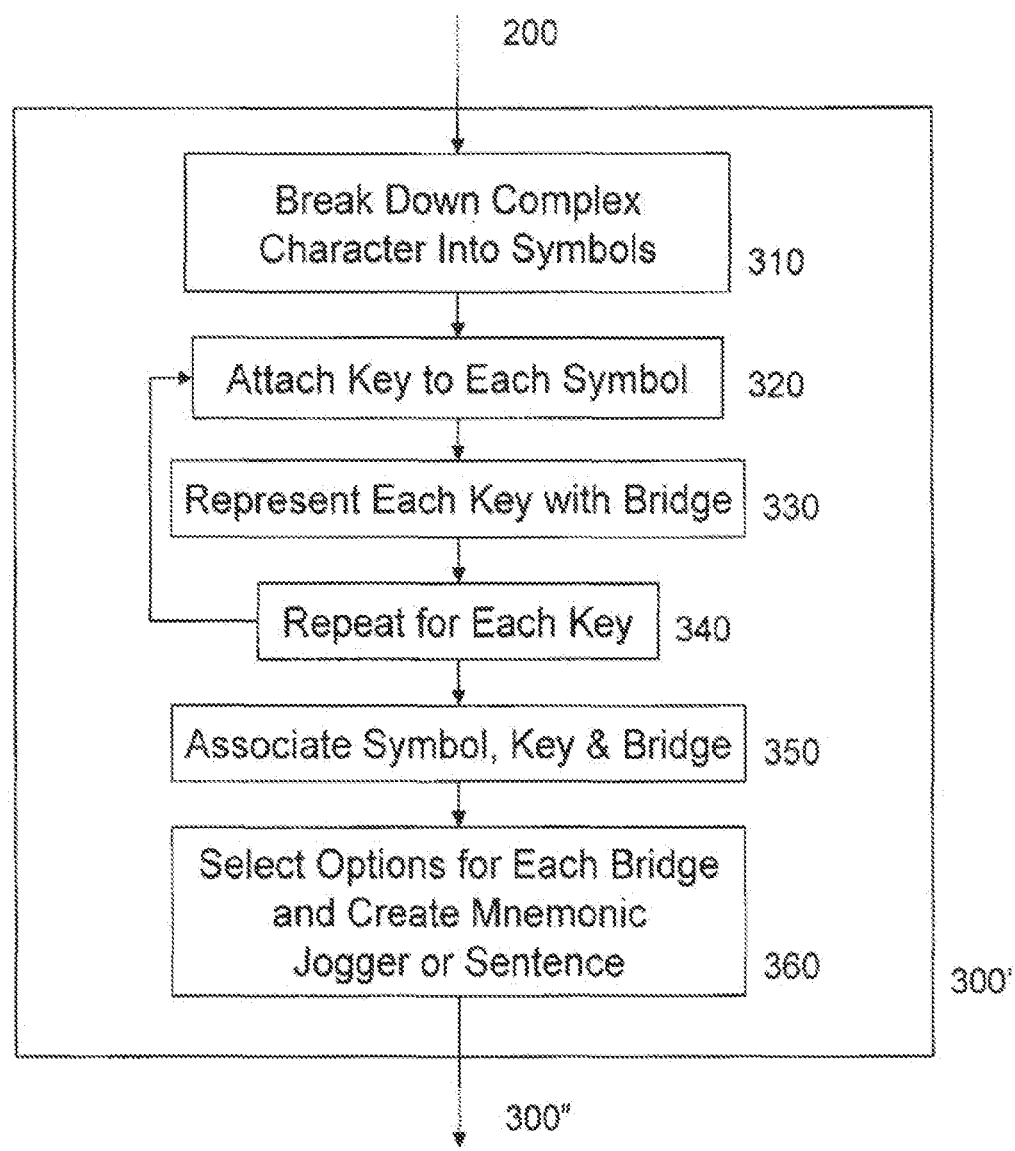
FIG. 2 is a flowchart expanding a portion of the flowchart of FIG. 1.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments of the present invention. Referring now to the figures of the drawings in detail and first, particularly to FIG. 1, there is shown a flowchart for applying The Key-Symbol System. The Key-Symbol System uses a memory association technique for making complex Characters easier to remember because they are composed of combinations of other, more basic Characters already known by the student.

In Step 100, the student begins learning some basic Characters. After a subset of basic Characters are learned, in Step 200, the student begins seeing combinations of these basic Characters in more complex Characters, the latter of which having a different meaning than the basic Characters when read separately. To remember how to write the complex Character, the student, in Step 300, applies The Key-Symbol System to break down the complex Character and associate an English mnemonic to the complex Character that, when remembered by the student, allows the student to reconstitute the complex Character from a combination of simpler known Characters. Later, when the student sees the complex Character, or wishes to write that complex Character, the student, in Step 400, applies the mnemonic to recreate the desired written Character. The more that the student applies the mnemonic, the greater the probability that the student adds, in Step 500, that complex Character to the known Characters in the student's vocabulary. As more characters are memorized after using The Key-Symbol System but without having to use the mnemonic, the student learns the written language automatically.

The recognition of simple Characters in a complex Character in Step 200 begins the process for using The Key-Symbol System. After recognizing the simple characters, the student, in Step 300, applies The Key-Symbol System to break down the complex Character. In particular, in Step 310, the complex Character is separated into its constituent parts, referred to herein as Symbols. These Symbols have particular meanings, already known to the student, because they are in the subset of the student's known basic Characters.

For understanding, The Key-Symbol System is applied in the following text to one exemplary complex Chinese Character 迷 meaning "to get lost." It is noted that The Key-Symbol System can be applied to any Chinese character-based language and use of the Chinese language as set forth below is only done as an example. This exemplary Character is composed of two basic Characters: 辶 for "step" and 米 for "rice." Each of these Characters is defined as a Symbol in The Key-Symbol System.

In Step 320, a Key is attached to each Symbol. The Key is the definition of the Symbol. For example, if the Symbol 辶 has the meaning "step," then the Key for that basic Character is the English word "step." Thus, the Keys for the complex Character 迷 for the verb "to get lost" are the English words "step" and "rice."

In Step 330, one or more unique letters in the Key is (are) used to represent the whole Key. The letter/s used to represent a Key is/are called a Bridge. For clarity, the letters in the Bridge are shown herein in capital form.

| SYMBOL | KEY | BRIDGE |
|---|---|---|
| 辶 | STep | "ST" |
| 米 | RIce | "RI" |

"Step" and "rice" are, therefore, the Keys and the letter combinations "ST" and "RI" are the Bridges. This process is repeated (Step 340) until all Bridges are defined for the Symbols in the Character.

In Step 350, each Key and its associated Bridge is connected to the Symbol in a close-knit group so that the three components—the Key, the Bridge, and the Symbol—are thought of as variations of each other. In other words, recalling one of the Key, the Bridge, or the Symbol immediately brings to mind the other two as set forth in the following diagram.

| SYMBOL | | KEY | | BRIDGE |
|---|---|---|---|---|
| 辶 | ↔ | STep | ↔ | ST |
| 米 | ↔ | RIce | ↔ | RI |

The two-headed arrows indicate that the student can easily swing back and forth—left-to-right or right-to-left—to convert any component into the other as desired.

It is important, now, to understand that all of the English vocabulary words have the possibility of containing a Bridge. The following text illustrates merely several possibilities out of a myriad of thousands of words:

STorm, STeer, STampede include the Bridge ST.
RIckshaw, RIdiculous, RIot include the Bridge RI.

In fact, for The Key-Symbol System, the student can use the vocabulary of jargon, slang, profanity, the argot of various professions, personal names, the names of commercial products and foreign words—even foreign words in a non-Latin alphabet if transliteration to the English alphabet is available, as is usually the case.

Understanding the foregoing, therefore, makes it possible, in Step 360, for the student to select mnemonic options, RIckshaw, for example, or any other word whose Bridge is RI, and to use that selected RI-word to lead back to the Key "Rice" which, in turn, leads back to the Symbol 米, which means that 米 is one of the Symbols in the Character for the verb "to get lost."

In the English language, there are many words containing the Bridges "RI" and "ST." Some words begin with one of these Bridges, and some words contain one of these Bridges. For example, the words "riot" and "crisis" each contain the Bridge "RI" and the words "storm" and "arrest" each contain the Bridge "ST." To apply The Key-Symbol System, the student defines the mnemonic from any combination of two words, each containing one of the Bridges. FIGS. 4 through 8 are example dictionary pages for a subset of possible Bridges. FIG. 4 shows many possible uses for the Bridge "BE" that always is associated with the symbol 生 having the meaning "beget." FIG. 5 shows many possible uses for the Bridge "CA" that always is associated with the symbol 忄 having the meaning "cardiac." FIG. 6 shows many possible uses for the Bridge "RI" that always is associated with the symbol 米 having the meaning "rice." FIG. 7 shows many possible uses for the Bridge "ST" that always is associated with the symbol 辶 having the meaning "step."

Therefore, to remember the complex Character 迷 for the verb "to get lost," the student knows that he/she needs to remember a catch-phrase, or mnemonic, having the two Bridges "ST" and "RI." Selecting one word from each of the above ST and RI examples to form the mnemonics: "STeering RIdiculously," "RIckshaw in a STorm," or "I got lost in a STampede or a RIot."

Now that the student has the mnemonic "STeering RIdiculously" associated with the Character for "to get lost," all that the student needs to do to recall the complex Character is to deconstruct the mnemonic. The student, then, determines the Bridges "RI" and "ST" from the mnemonic. The student knows that the Bridge "RI" always carries the Key "rice" and that the Bridge "ST" always carries the Key "step." Because the student already knows the simple Chinese Characters 辶 and 米 for the words "step" and "rice," respectively, the student merely writes down these two Characters next to one another and, therefore, has written the complex Character 迷 having, as its meaning, "to get lost."

In summary, when learning a new complex Character, the Character, first, must be broken down into its Symbols (Step 310). Then, each Symbol is converted to a respective Key (Step 320). Then, each Key is converted into a Bridge (Steps 330, 340) and associations are formed (Step 350). The Bridges are used as the criterion for selecting memory jogging words from the general vocabulary of the student that have some relevance to the Character under consideration (Step 360). Once the student selects a word from his/her general vocabulary, this word, then, becomes part of a mnemonic or Memory Jogger Sentence for the Character the student is learning. In the above example, one student may pair up the Memory Joggers STorm and RIckshaw. Another student may pair up STeer and RIdiculous. A third student may pair up STampede and RIot as the Memory Jogger. These Memory Joggers are selected for their relevance to the meaning of the Character 迷 meaning "to get lost." They are, then, put together into a Memory Jogging Sentence along with the meaning of the Character so that a logical sentence emerges:

to get lost in a STampede or RIot.
to get lost, like a RIckshaw in a STorm.
i got lost from STeering RIdiculously!

The Memory Joggers may occur anywhere in the sentence and in any order. All that matters is that the student selects a Memory Jogger that is best remembered by that particular student. Once the Memory Jogger is learned, the student is able to use it to write the represented character by mentally reciting the Memory Jogger.

"to get lost in a STampede or RIot."

Figure 3:
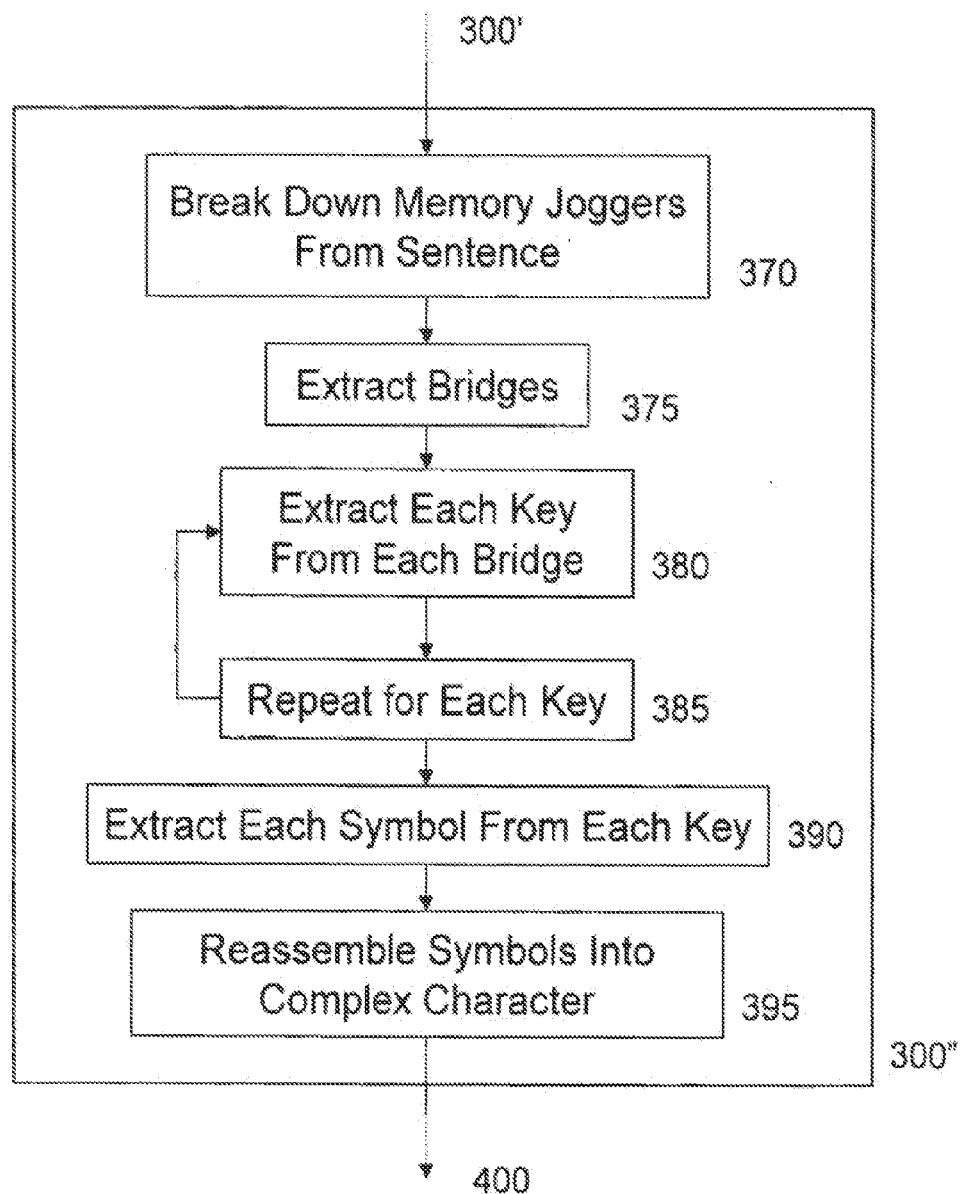
FIG. 3 is a flowchart expanding a portion of the flowchart of FIG. 1 subsequent to the portion of FIG. 2.

Deconstruction of the Memory Jogger or Memory Jogging Sentence is accomplished in the reverse order and this process is assisted with regard to FIG. 3. In Step 370, the Memory Joggers are mentally isolated from the rest of the sentence, e.g., "STampede" and "RIot." The Bridges are extracted from the Memory Joggers in Step 375, e.g., to produce "ST" and "RI." The Bridges are used to lead to their respective Keys in Step 380 and 385. In particular, ST leads to the Key "STep" and RI leads to the Key "RIce." These two Keys, in Step 390, lead to their respective Symbols, e.g., 辶 for "step" and 米 for "rice." Finally, in Step 395, the Symbols are reassembled into the complex Character as shown in the following example:

辶 + 米 = 迷

Even though The Key-Symbol System is applied in the above example with the complex Chinese Character meaning "to be lost," this example is only one of a multitude of possibilities and is only one possibility for the character-based Chinese language.

The Key-Symbol System works easily with complex Characters such as those examples set forth above. Chinese character-based languages, however, do not have only these easy-to-form complex Characters, but also variations in those complex Characters and variations in the simple Characters.

With Chinese, for example, there are over 200 common Chinese radicals, many of which have multiple forms. For a standard exemplary index of these radicals, reference is hereby made to the inside front and rear covers of "Reading & Writing Chinese Simplified Character Edition—A Comprehensive Guide to the Chinese Writing System," by William McNaughton (hereinafter "McNaughton"), which are hereby incorporated herein by reference in their entireties. McNaughton lists 227 modern Chinese radicals on the inside front cover and 214 traditional Chinese radicals on the inside rear cover. Most of these radicals appear in various forms when used by Chinese writers. For example, the second of the Modern Chinese radicals having the meaning "one," is shown in its various forms in the second entry to the chart of FIG. 9 (which illustrates 245 different inventor-selected radicals and their corresponding visually similar forms in separate four-part matrices, each matrix having an upper part and three lower parts).

One question that can be asked in The Key-Symbol System is how to differentiate between, for example, the three variations 末 未 本 of the Chinese symbol 木 (see traditional Chinese radical 75 in the rear cover of McNaughton and radical 75 in FIG. 9). This Symbol (referred to as a Source below) has various meanings, including "tree" and "arbor". In this case, Arbor is chosen to be the Key for this Symbol. Each of the three variations is very close in appearance to the Symbol but they have substantially different meanings ("end", "not yet", and "root/origin", respectively). The similar appearance allows them to be associated with the Symbol for "ARbor" and, accordingly, also be associated with the same Bridge AR, with the intersection of the horizontal stroke being located at different points on the ARbor radical, the different intersection heights providing a basis for distinguishing these three Icons from one another.

With such variations in single Characters, The Key-Symbol System can be expanded to address these and other concerns using a Source-Icon System, a subdivision of and/or a complement to The Key-Symbol System.

The Key-Symbol System selects an English word (the Key) and its Bridge (the one-, two-, or three-letter abbreviation of the Key) and joins them to a given Character to form a trio. (See the Symbol-Key-Bridge diagram above.)

In the Source-Icon System, the Symbol of the Trio is considered as a "Source" for other symbols that resemble it or that, in some way, form a pattern with the Symbol. These other symbols are referred to as "Icons"—or reflections—of the Source. Each Source can be theoretically understood as "generating" three Icons.

Flowing from this logical grouping is an understanding that the Icons are to be included in the same Trio as the Source and, therefore, will share the same Key and Bridge of the Source. There exists a need to distinguish between the Key-Bridge of the Source and the Key-Bridge of each of the three Icons and it is the Source-Icon System that provides the ability to do so.

The Source-Icon System modifies the Bridge (and, thereby, the Key) by taking advantage of the upper- and lower-case forms of each of the two letters within the Bridge. Binary logic of upper and lower case letters provides four possible configurations for a two-letter Bridge. Using the Bridge "ST", for example, generates the following four possibilities: "ST", "St", "st", and "sT". The Source-Icon takes advantage of this definite set to associate the single Source from the three possible Icons associated with that Source.

To provide a particular example for this association, the Chinese Character for "daytime," 日, is used. (It is noted that this Character also means "sun".) The Bridge for the English word "daytIMe" is IM having two upper case letters. (It is noted here that, in the Source-Icon System, the Bridge for the Source is always two upper-case letters.) The three other possible case configurations are: "Im" (upper-lower), "im" (lower-lower), and "iM" (lower-upper). Three symbols that resemble the daytIMe symbol are shown in FIG. 11. A natural pattern can be formed from this organization and is represented in the matrix shown in FIG. 12.

Moving from left to right, the different vertical stroke "slides" from the upper position to the middle position, to the lower position. In this way, each Icon can be called forth in the student's mind by using the two-letter Bridge associated with each of the three Icons. The daytIMe radical is represented by the Bridge IM in two capital letters. The three other possibilities for representing the Bridge IM are Im, im, and iM. These can be referred to by a student as eye-em-1, eye-em-2, and eye-em-3 or, if preferred, daytime-1, daytime-2, and daytime-3. 日 is the parent radical (i.e., the Source) and, therefore, can be expressed as eye-em-zero or daytime-zero, or just IM-zero.

Because the three look-alikes are Icons, they can be referred to in a very general sense as I-1, I-2, and I-3 (I-zero would be the Source in this case).

At this point, the Key-Bridge System can be used to create mnemonics or Memory Jogger Sentences as set forth above, but with the four possible lower-upper-case Bridges combining the two letters within the Bridge of the Source. The chart in FIG. 13 includes 3 complex Characters including the simple characters 氵 (wATer), 口 (INgest), and 木 (ARbor).

FIG. 9 is an exemplary illustration of 238 different Symbol Sources for various Chinese Characters and the one, two, or three Icons associated with the respective Source. The 72$^{nd}$ Source on page 3 of FIG. 9, for example, illustrates the matrix for the Symbol 日 and the 75<sup>th</sup> Source on that same page of FIG. 9 illustrates the matrix for the Symbol 木. As can be seen in FIG. 9, some of the matrices (which substantially correspond to the most well-known Chinese radicals) are not filled with Icons because they are left open for a student's own personal use.

In The Key-Symbol System, the ideograph is referred to as a Symbol. This term tells a student what the ideograph is, such as a symbol or picture of something like a sun, a heart, a hill, a mouth. However, when the ideograph is referred to in the Source-Icon System as a Source, the description is telling the student how it behaves (not what it is). A Source is, therefore, a starting place for something else and generates that something. In other words, the Symbol is like the anatomy of the ideograph and the Source is like its physiology. If an ideograph is a source, it generates something similar to itself, like I-1, I-2, and I-3. It is that physical similarity that allows the student to memorize the group of Icons. These Icons are, then, put into a logical sequence that becomes a second memory aide. It may be high-to-low (see matrix 72 in FIG. 9), simple-to-complex (see matrices 12 and 105), or one-to-many (see matrices 28 and 29).

The Source can be considered as generating the characters that are grouped together with it. The meanings (i.e., translations) need not be similar in a given group. Instead, they are grouped based upon their physical resemblance. The Icons for ARbor form such a physical example regardless of meaning. The meanings of AR-1 (end), AR-2 (not yet), and AR-3 (origin) are not similar to the meaning of AR-0 (tree). However, the Icons physically resemble the Source so well that the grouping will aid a student in remembering them. This construction is different from the pattern followed in Key-Symbol System. There, the process matched up a Symbol with its translation. In the Source-Icon System, a Symbol is matched with other look-alike Symbols. The term Icon is applied to these look-alikes because they are—like computer icons—small pictures. Just as a computer icon brings up a larger program, these Icons announce that they are all members of a larger family.

Another example applying both The Key-Symbol and Source-Icon Systems uses the Chinese complex Character for turban 帊. The English translation for the first of these Characters is "NApkin" and the second is the Ar-1 Icon of the ARbor Key. So, the Bridges for this complex Symbol are NA and Ar. Therefore, the chart in FIG. 14 can be generated.

In the student's mind's eye, the student pictures a bandana being coiled around a head to form a turban. When it comes time to write the word, the script that runs through the student's mind can be:

In my Memory Jogger Sentence
the "NA" of banda<u>NA</u> was NA-0; and
the "Ar" of <u>A</u> roun<span style="text-decoration:overline">d wa</span>s AR-1.

NA is napkin, napkin is 巾. Therefore, the word mwò, turban, has a first Character equal to 巾.

Ar-1 is the second Character of turban and "Ar" is arbor-one: 才.

By writing down this process, the Student uses all of his/her senses, like feeling it with his/her fingers. The student looks at it, says it out loud to hear it, and repeats the process until the sentence is committed to memory.

Another example of a complex Chinese Character that uses Symbols already mentioned above is the Character 口木 —wèy, meaning taste, flavor, or smell. This Character is derived from the two simple Characters for "ingest" and the arbor-2 Icon. So, the two Bridges that are needed to construct this Character in the Source-Icon System are IN and ar.

| Symbol | Transliteration | English | Memory Jogger Sentence |
|---|---|---|---|
| 口木 | wèy | taste | I Never <u>taste</u> garlic. |

An example Chinese complex Character using an a<u>R</u>-3 word is the complex Character 仆, which is translated into the English words "body, in person, style or system." The first simple character of this complex Character means "man" and the second simple character is the Icon aR-3. Therefore, the two Bridges for this complex Character are MA and aR. To create a Memory Jogger Sentence, the following exemplary association is provided.

| Symbol | Pronunciation | English | Memory Jogger Sentence |
|---|---|---|---|
| 仆 | tǐ | body | a mAN's body is musculaR. |

The Bridge AR for the word "arbor" is not the only Bridge possible for that Symbol when defined initially by the invention. Another meaning for the Symbol 木 is "tree". Thus, an alternative Bridge for this Symbol could have been TR but, the former was selected for the invention. But, it has been found that Memory Jogger Sentences can be formed easier if the Bridge has vowel as the initial letter. Thus, for the most common radicals it would be better to use the "vowel-Bridge" AR instead of a "consonant-Bridge" TR.

There is another possible alternative for Bridges where the Bridge does not form the first two letters of the Key. For example, the Key "arbor" has the initial two-letter combination "AR" as its Bridge. Another possible alternative is to use a middle set of two letters in the Key as the Bridge. For example, the English word "water" can use the Bridge "AT" instead of "WA".

In such a case, it will be easier for the student to make a Memory Jogger sentence with the letters "AT" than with the letters "WA".

To demonstrate the flexibility of The Key-Symbol System, an example regarding a character that is similar in both Chinese and Japanese is provided in the following text.

The traditional Chinese radical 213 was 龜, pronounced "guī" and meaning "tortoise". This form was taken up by the Japanese and simplified to 亀, pronounced "kame" and also meaning "tortoise." In 1957, the People's Republic of China instituted a revamping of its entire character system to modernize the characters. It further simplified radical 213 to 龟. The Key and Bridge for this Symbol are tortoise and OI. These three forms coexist side-by-side and are currently used.

The student accepts whichever form corresponds to the course he or she is studying—Classical or Modern Chinese, Korean, Japanese, or even Vietnamese and attaches "tortoise" and "OI" to that form. Indeed, there is no impediment to learning all three as, no doubt, the professional linguist would. It would also encourage the student of one form to learn the other forms and, thereby, enhance his or her knowledge of Asian linguistics and stimulate interest in learning other Asian languages because the student already has a head start. Many sources recommend the learning of the various forms, as there is significant admixture in China and abroad.

Other radicals have undergone similar three-fold changes from Classical Chinese to Japanese to Modern Chinese. The following are merely three examples of such changes.

Radical 210: 齊  □

Radical 211: □  □

Radical 212: □  □

The Symbol  is pronounced "watakushi" in Japanese and "sa" in Korean. It means "I" in Japanese and "selfish, personal, or private/privacy" in Chinese and Korean. The left-hand radical in this complex Symbol is translated into the English word AGriculture (or AGri for short) and has the Bridge AG. The right-hand radical in this complex Symbol is translated into the English word SElfish and has the Bridge SE. The Japanese or Korean student will learn in an exemplary fashion as set forth below.

If a Japanese student likes boating, he or she might generate the following as a Memory Jogger Sentence: "i am an AGgressive SEafarer".

For the Korean student, the word for "privacy" can use the following Memory Jogger Sentence: "privacy during SEx is AGeless."

Applying The Key-Symbol System along with the Source-Icon System can dramatically improve a student's speed in learning a character-based language.

Figure 10:
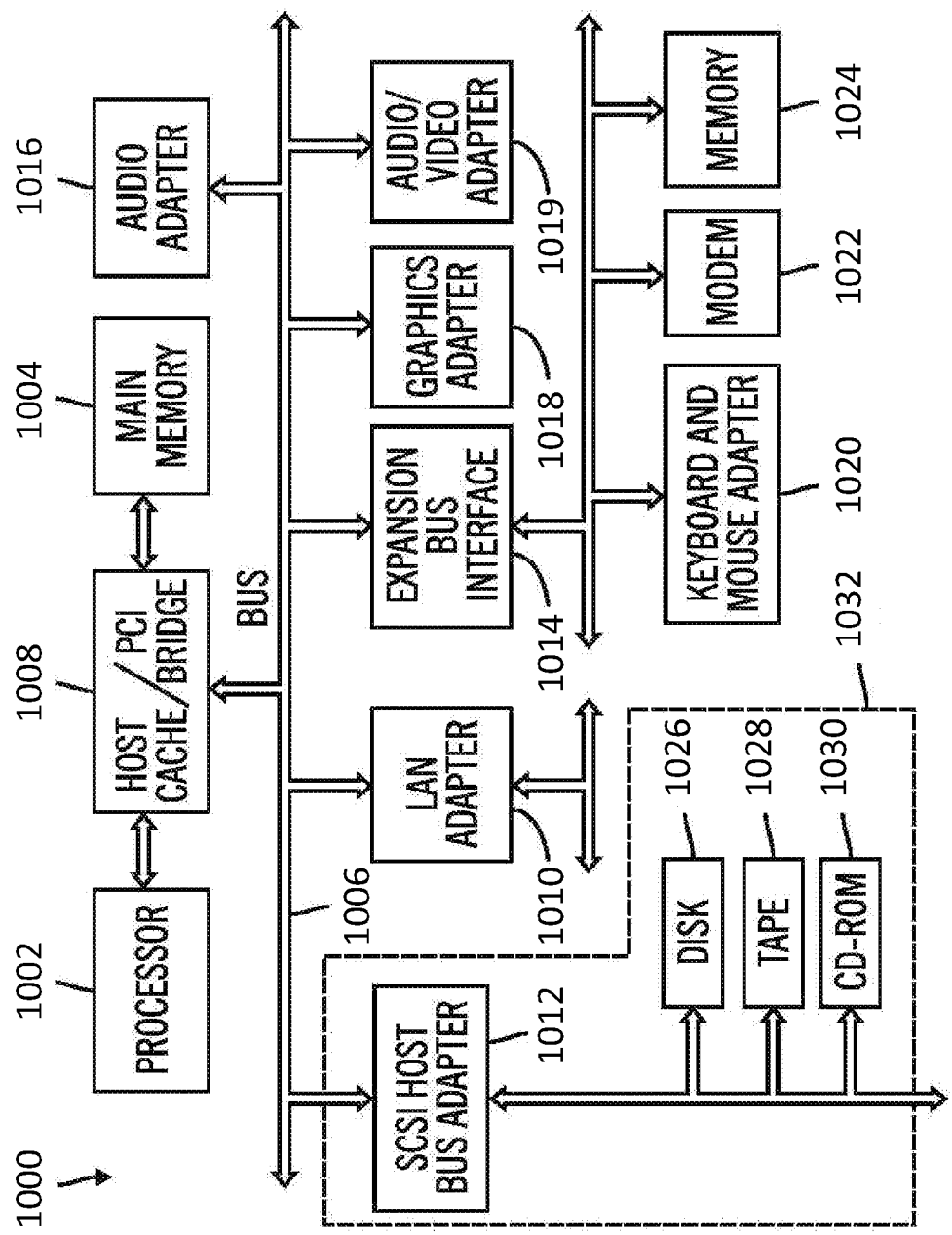
FIG. 10 is a block circuit diagram of a data processing system that may be implemented as a computer system for learning Chinese-based character script in accordance with exemplary embodiments of the present invention.

In another exemplary embodiment, an exemplary Key-Symbol System in accordance with the present invention is implemented using a computer system including an electronic key-symbol dictionary. Referring to FIG. 10, a block diagram illustrating an exemplary computer or data processing system 1000 is depicted in which the present invention may be implemented. The exemplary data processing system 1000 employs a peripheral component interconnect (PCI) local bus architecture. Although the depicted example employs a PCI bus, other bus architectures such as Accelerated Graphics Port (AGP) and Industry Standard Architecture (ISA) may be used. The processor 1002 and main memory 1004 are connected to PCI local bus 1006 through PCI bridge 1008. PCI bridge 1008 also may include an integrated memory controller and cache memory for processor 1002. Additional connections to PCI local bus 1006 may be made through direct component interconnection or through add-in boards. In the depicted example, local area network (LAN) adapter 1010, SCSI host bus adapter 1012, and expansion bus interface 1014 are connected to PCI local bus 1006 by direct component connection. In contrast, audio adapter 1016, graphics adapter 1018, and audio/video adapter 1019 are connected to PCI local bus 1006 by add-in boards inserted into expansion slots. Expansion bus interface 1014 provides a connection for a keyboard and mouse adapter 1020, modem 1022, and additional memory 1024, for example. Small computer system interface (SCSI) host bus adapter 1012 provides a connection for hard disk drive 1126, tape drive 1128, and CD-ROM drive 1130, for example. Typical PCI local bus implementations will support three or four PCI expansion slots or add-in connectors.

An operating system runs on processor 1002 and is used to coordinate and provide control of various components within the data processing system 1000 in FIG. 10. Each user is able to execute a different operating system. The operating system may be a commercially available operating system, such as WINDOWS XP® or WINDOWS 7®, which are available from Microsoft Corporation. A database program such as ORACLE® may run in conjunction with the operating system and provide calls to the operating system from JAVA® programs or applications executing on data processing system 1000. Instructions for the operating system, the object-oriented operating system, and applications or programs are located on storage devices, such as hard disk drive 1026, and may be loaded into main memory 1004 for execution by processor the 1002.

Those of ordinary skill in the art will appreciate that the hardware in FIG. 10 may vary depending on the implementation. Other internal hardware or peripheral devices, such as flash ROM (or equivalent nonvolatile memory) or optical disk drives and the like, may be used in addition to or in place of the hardware depicted in FIG. 10. Also, the processes of the present invention may be applied to a multiprocessor data processing system.

As another example, the data processing system 1000 may be a stand-alone system configured to be bootable without relying on some type of network communication interface, whether or not data processing system 1000 includes some type of network communication interface. As a further example, the data processing system 1000 may be a Personal Digital Assistant (PDA) device, which is configured with ROM and/or flash ROM in order to provide non-volatile memory for storing operating system files and/or user-generated data.

The depicted example in FIG. 10 and above-described examples are not meant to imply architectural limitations. For example, the data processing system 1000 also may be a notebook computer or hand-held computer in addition to taking the form of a PDA. The data processing system 1000 also may be a kiosk or a Web appliance.

In an exemplary embodiment, the data processing system 1000 hosts an electronic key-symbol dictionary program for learning multi-radical words in a Chinese-character-based language having a set of Chinese radicals. The electronic key-symbol dictionary includes electronic key-symbol pages, each of which is respectively associated with a single Chinese radical within the set of Chinese radicals. Each of the key-symbol pages includes (e.g., displays) thereon the single Chinese radical as a symbol and a single key corresponding to a given meaning of the single Chinese radical. The single key is in the user's language (which can be predetermined at the outset of operation of the computer-based Key-Symbol System) and has letters in the user's alphabet. The key includes therein in a Bridge comprised of at least one of the letters in the user's alphabet. In an exemplary embodiment, two letters comprise the Bridge. Each of the key-symbol pages further displays thereon a list of memory joggers, each being a word in the user's language containing at least the Bridge. The list of memory joggers is selected such that a multi-radical word with at least two of the Chinese radicals can be recognized with a mnemonic formed from one memory jogger from each key-symbol page associated with each of the at least two Chinese radicals.

In this exemplary embodiment, the electronic key-symbol dictionary also includes a user-recognized radical dictionary containing a sub-set of the key-symbol pages, the sub-set including only those Chinese radicals that are user-recognized. As each page in the sub-set of user-recognized radical pages are included, each key-symbol page has a key associated with the respective Chinese radical, a Bridge associated with the key, and the memory joggers associated with each page. If desired, there can be an index or table of contents listing only the user-recognized Chinese radicals without the key-symbol-memory jogger information.

The exemplary electronic key-symbol dictionary further includes a user-recognized multi-radical dictionary containing a list of user-recognized multi-radical words (as used herein, "multi-radical" is also referred to as "complex-character"). Each entry in the list of user-recognized multi-radical words includes a written form of the multi-radical word containing at least two of the user-recognized radicals and a written form of the meaning of the multi-radical word in the user's language. Each entry further includes the Bridge entry for each of the at least two of the user-recognized radicals within the multi-radical word and a mnemonic (also referred to herein as a "mnemonic phrase") in the user's language for recalling the written form of the multi-radical word. The mnemonic is based upon at least one memory jogger for each of the user-recognized radicals within the multi-radical word. The computer system 1000 is operable to process the mnemonic and transcribe the recognized set of the user-recognized radicals to form the written multi-character.

The following text describes the process of how a user (i.e., a student) applies the systems and methods of the instant invention for learning the written script of Chinese-character-based languages using a computer-based key-symbol system including an electronic key-symbol dictionary.

The student of the Chinese-written language is first provided with a key-symbol dictionary. In this exemplary electronic embodiment the key-symbol dictionary is in the form of data stored on the computer, e.g., in memory 1024. The key-symbol dictionary can be any kind of database and even, for example, a spreadsheet or a set of spreadsheets. The data is organized in what is referred to as dictionary pages. Each dictionary page of the electronic key-symbol dictionary contains Bridge entries in the form of text. Each of the Bridge entries is respectively associated with a single Chinese radical (see, e.g., 辶 at the top of FIG. 7) within the set of as many Chinese radicals that is desired to be contained in the key-symbol dictionary, preferably, all known Chinese radicals. Each of the Bridge entries defines the single Chinese radical as a symbol, as explained above. Each of the Bridge entries has a single key corresponding to a given meaning of the respective Chinese radical (see, e.g., "step" at the top of FIG. 7). The single key is in a user's language (e.g., English) and has letters in the user's alphabet (e.g., "s", "t", "e", and "p"). As set forth above, the user's language can be any Latin alphabet-based language such as Spanish, Portuguese, French, Italian, or German, or to transliterations of non-Latin alphabets such as Russian, Greek, Hebrew, Aramaic, Arabic, etc. The single key includes therein a Bridge comprised of at least one of the letters, preferably two letters as shown, e.g., at the top of each of FIGS. 4A, 4B, 5A, 5B, 6A, 6B, 7, and 8A to 8F and, in particular, "ST" at the top of FIG. 7. These Bridge entries each have a plurality of different memory joggers, each of the different memory joggers being a word in the user's language containing therein the Bridge. Examples of dictionary pages are shown in FIGS. 4A, 4B, 5A, 5B, 6A, 6B, and 7.

Once provided with the key-symbol dictionary, the student of the Chinese-written language begins to learn basic and easily recognizable characters. These characters become the lexicon of a particular student. As those with experience in learning the Chinese-written language know, these characters are referred to as radicals of the Chinese-written language. From this, the user starts creating a first sub-dictionary of user-known or user-recognized radicals, the sub-dictionary being those dictionary pages corresponding to each and every radical known to the user—collectively referred to as the user-recognized radical dictionary. A corollary to creating this sub-dictionary is that the user now has a unique, relatively small dictionary that is personal to the student having, for each user-recognized radical, the Bridge associated with each respective user-recognized radical and the key associated with that Bridge.

After a number of radicals are known and easily recognized (see e.g., FIG. 1, step 100), the student starts to recognize, in step 200 of FIG. 1, these already known radicals within unknown multi-radical characters. For example, in a two-radical multi-character, the student knows a first radical but does not know the second radical and, therefore, the student needs to learn the second radical. The method of the invention described herein gives the student a process for learning this multi-radical (i.e., complex) character along with the learning the second radical. Alternatively, in a two-radical multi-character where the student knows both radicals, the student is ready to learn the multi-radical character right away.

In the first example, once the student has identified a complex Chinese multi-character to be learned, the student sets out to learning each unknown radical in the complex Chinese multi-character and adds the respective dictionary page(s) to the user-recognized radical sub-dictionary. When the student is ready to learn the written form of the complex Chinese multi-character, the student associates the radicals within that complex Chinese multi-character together. For example, the student can transcribe the set of radicals within the complex Chinese multi-character to be learned on a piece of paper. Alternatively, in the instant computerized embodiment, the student can execute a routine that starts the generation of a second sub-dictionary referred to as the user-recognized complex-character dictionary. Each page of the user-recognized complex-character dictionary includes the written complex character and the Bridge entries for all of the radicals within the complex character to be learned. The Bridge entries can be arranged in the order of appearance of the radical within the complex character or they can be in any desired order that makes memorizing the complex character easier to the student.

In the following example, if the student already recognizes the two radicals for step and rice, respectively, the symbols 辶 and 米, when the student sees the complex character 迷 he or she can learn it right away. The student discovers that this complex character is pronounced "mee" and has the meaning "to be lost." The routine for adding complex characters to the user-recognized complex-character dictionary is started by entering this information or selecting it from a complex-character database, which can have any number of complex Chinese written characters stored therein and easily accessible by using the meaning in the user's language (e.g., by searching for the word "lost"). If the written complex character is selectable from such a database, then the routine can populate, into the new entry of the user-recognized complex-character dictionary, a page having (1) these two radicals, (2) the Bridge entries for each of the two radicals, (3) the complex-character, and (4) the meaning of the complex character in the user's language. With the Bridge entries known, the routine can also populate the symbols for each radical automatically on this new page in a visual framework for that mnemonic phrase:

辶 + 米 = 迷. "to get lost" (mee) _____ ST _____ RI _____.

Then, the routine can display to the student two lists of memory joggers, one list corresponding to each of the radicals in the complex character. Such lists are illustrated, e.g., in FIGS. 6A-6B and 7 for the Bridges "ST" and "RI". The student then, in step 300 of FIG. 1, creates a mnemonic for the complex character by selecting one memory jogger from each list. For this example, the student selects "STep" and "RIce" (e.g., by clicking on them with a mouse) and the routine, then, populates the mnemonic phrase including both memory joggers therein as follows:

辶 + 米 = 迷. "to get lost" (mee) _____ STep _____ RIce _____.

The student, then, edits the mnemonic phrase by filling in the blanks as follows to complete the data entry process and finalize the mnemonic to be used in the future:

辶 + 米 = 迷. "to get lost" (mee) is to STep in a RIce patty.

This mnemonic is electronically transcribed in the language of the user on the complex-character dictionary page for recalling the written form of the complex Chinese multi-character for the word meaning "to get lost" in step 500 of FIG. 1, the mnemonic being based upon the keys, memory joggers, and Bridges associated with the recognized set of the two user-recognized radicals within this complex Chinese multi-character.

It is possible that the student does not prefer either or all of the memory joggers that are available in the list of memory joggers for one or more dictionary pages. In such a case, the student is not limited to the pre-defined list of memory joggers. Using the power of the computer to search for almost anything, whether in its own database or via databases available on the Web, the student can find their own memory joggers containing the Bridge(s) at issue. Take, for example, a student trying to learn the Chinese multi-character that means "sex." The multi-character is made up of the Chinese radicals corresponding to the keywords CArdiac and BEget, having "CA" and "BE" as the Bridges. The student running the inventive computer routine decides that the memory joggers in the CA and BE dictionary pages are just not desirable for that student's use. Therefore, the student can go to any website that provides to a user synonyms of any word searched (e.g., www.thesaurus.com). Typing in the word "sex" obtains a list of synonyms. Now, the <find> function (typically called by using the keystroke combination <ctrl><f>) can be used to search for every word in the results list that contains either of the Bridges CA or BE. By searching for the Bridge CA, for example, these letters become highlighted in every word where the Bridge occurs. The result contain, for example, castrate, erotica, caution, or even an unexpected entry like cabin. This is repeated for words that have the Bridge BE in them. The student can, then, pick-and-choose from both the pre-defined sets of memory joggers that go along with sex or can enter his/her own choices obtained from the Web. In this example, for instance, the following can be the memory jogger sentence for the word "sex"—"i had sex BEhind a Cabin. Once the memory jogger sentence is defined, the new complex-character dictionary page is added to the user-recognized multi-radical dictionary.

The student, then, studies each page within the user-recognized complex-character dictionary over time. As he/she sees the complex character in its written form, the student can use the routine (e.g., step 400 of FIG. 1) to search in the user-recognized complex-character dictionary for the Bridge entries ST or RI or for either or both of the symbols "step" or/and "rice" or for the English meaning of the now known multi-character "to get lost" or "lost." When using the routine, the mnemonic phrase is displayed. Alternatively, if the student knows he/she wishes to write the word "lost" and desires to manually create the mnemonic and determine the written form of that complex character, the student would first remember the phrase "to STep in a RIce patty" and pull out of the phrase the two Bridge entries ST and RI. With these Bridge entries, the student knows the exact written form of the radicals and merely draws the two characters 辶 and 米 next to one another to complete the transcription of the multi-character utilizing the mnemonic.

Once the user-recognized complex-character dictionary has a number of entries, it becomes clear that the present invention is able to provide a truly alphabetic dictionary of Asian characters, something that has not been possible to date. The list of sixteen Kanji in FIG. 15 demonstrate how the user-recognized complex-character dictionary provides an alphabetically ordered dictionary [*=classifying radical] starting with AN*-AN-ED-LI and ending with TE-TH*.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for learning scripts of Chinese-character-based languages using a computer-based key-symbol system, the method comprising:
    storing a set of pages in an electronic key-symbol dictionary, each of the pages:
        having a bridge entry respectively associated with a single Chinese radical within a set of Chinese radicals in a Chinese-character-based language;
        having the single Chinese radical as a symbol;
        having a single keyword corresponding to a given meaning of the single Chinese radical, the single keyword:
            being in a user's language and having letters in the user's alphabet; and
            including therein a bridge comprised of at least one of the letters; and
        having a plurality of different memory joggers, each of the different memory joggers being a word in the user's language containing therein the bridge;
    creating a user-recognized radical dictionary by identifying a list of user-recognized Chinese radicals and electronically collating the pages associated with each of the user-recognized Chinese radicals; and
    creating a user-recognized complex-character dictionary by:
        identifying a complex Chinese multi-character to be learned;
        electronically transcribing a set of at least two of the user-recognized Chinese radicals within the complex Chinese multi-character to be learned; and
        electronically transcribing a mnemonic in the language of the user for recalling the written form of the complex Chinese multi-character, the mnemonic being based upon the keywords, memory joggers, and bridges associated with the recognized set of the at least two user-recognized Chinese radicals within the complex Chinese multi-character.

2. The method according to claim 1, which further comprises recalling the written form of a Chinese multi-character by:
    selecting the Chinese multi-character from one of the complex Chinese multi-characters within the user-recognized complex-character dictionary; and
    displaying the mnemonic associated with the one complex Chinese multi-character within the user-recognized complex-character dictionary.

3. The method according to claim 1, which further comprises carrying out the list-identifying step by electronically adding a new page of the electronic key-symbol dictionary to the user-recognized radical dictionary for each new user-recognized Chinese radical.

4. The method according to claim 1, which further comprises utilizing the bridge as the first two letters of the selected keyword.

5. The method according to claim 1, wherein the complex Chinese multi-character has a meaning different from constituent parts of the user-recognized Chinese radicals within the complex Chinese multi-character when read separately.

6. The method according to claim 1, which further comprises carrying out the mnemonic-transcribing step by:
   displaying the complex Chinese multi-character into the separate Chinese radicals within the list of user-recognized Chinese radicals;
   displaying the keywords and associated bridges for each of the separate Chinese radicals within the complex Chinese multi-character;
   selecting memory joggers from each of the pages for each of the separate Chinese radicals in the user-recognized radical dictionary; and
   electronically creating the mnemonic in the language of the user based upon the selected memory joggers.

7. The method according to claim 1, which further comprises carrying out the mnemonic-transcribing step by emphasizing the bridge within the mnemonic.

8. The method according to claim 1, which further comprises carrying out the mnemonic-transcribing step by emphasizing the bridge with a different typeface than the remainder of the letters in the mnemonic.

9. The method according to claim 2, which further comprises identifying the written form of the complex Chinese multi-character by associating together each of the symbols corresponding to the at least two user-recognized Chinese radicals.

10. The method according to claim 9, which further comprises carrying out the written-form-identifying step by:
    displaying the mnemonic associated with the complex Chinese multi-character;
    extracting the memory joggers within the mnemonic;
    extracting the bridges contained within the memory joggers;
    displaying the symbols associated with the extracted bridges; and
    organizing the displayed symbols to form the written multi-character.

11. The method according to claim 1, wherein the Chinese-character-based language is selected from at least one of the group consisting of Japanese, Korean, Mandarin, Fu, Cantonese, Amoy Hokkien, Taiwanese, Thai, Vietnamese, Singaporean.

12. The method according to claim 1, which further comprises selecting the language of the user from one of Latin alphabet-based languages and transliterations of non-Latin alphabet-based languages.

13. The method according to claim 12, which further comprises selecting the language of the user from Spanish, Portuguese, French, Italian, German, Russian, Greek, Hebrew, Aramaic, and Arabic.

14. The method according to claim 1, which further comprises defining each of the set of Chinese radicals as a source and associating at least one icon with a respective source, the at least one icon being a Chinese character having a physical similarity to the source.

15. The method according to claim 14, which further comprises selecting the physical similarity from a group consisting of a visual similarity, a multiple occurrence similarity, and a similarity in meaning.

16. The method according to claim 14, which further comprises:
    for each user-recognized Chinese radical, defining a keyword corresponding to a selected definition of the user-recognized Chinese radical from a range of more than one definition for that user-recognized Chinese radical and defining a bridge corresponding to two letters within the keyword;
    storing the source with the two letters in upper case;
    storing a variation of the source having at least one of the two letters in lower case; and
    storing the variation of the source as an association of the at least one icon.

17. The method according to claim 14, which further comprises defining the at least one icon to be three icons.

18. The method according to claim 16, which further comprises:
    defining the at least one icon to be three icons;
    storing the source with the two letters of the bridge in upper case;
    storing three variations of the source having:
        a first letter in upper case and a second letter in lower case;
        the first letter in lower case and the second letter in lower case; and
        the first letter in lower case and the second letter in upper case; and
    storing the three variations of the source as an association of a respective one of the three icons.

19. The method according to claim 14, which further comprises selecting the Chinese radicals from one of modern Chinese radicals and traditional Chinese radicals.

20. The method according to claim 19, which further comprises forming a four-part matrix for each of the Chinese radicals, each of the four parts corresponding to one of the source and the three variations.

* * * * *